(12) United States Patent
Diedrich et al.

(10) Patent No.: US 11,663,252 B2
(45) Date of Patent: May 30, 2023

(54) PROTOCOL, METHODS, AND SYSTEMS FOR AUTOMATION ACROSS DISPARATE SYSTEMS

(71) Applicant: Auction Edge, Inc., Seattle, WA (US)

(72) Inventors: Daniel E. Diedrich, Seattle, WA (US); Michael Stephen Rhoden, Seattle, WA (US); Mark Phillips, Seattle, WA (US); Julie Elizabeth Warpool, Seattle, WA (US)

(73) Assignee: Auction Edge, Inc., Seattle, WA (US)

( * ) Notice: Subject to any disclaimer, the term of this patent is extended or adjusted under 35 U.S.C. 154(b) by 0 days.

(21) Appl. No.: 17/227,909

(22) Filed: Apr. 12, 2021

(65) Prior Publication Data

US 2022/0100784 A1 Mar. 31, 2022

Related U.S. Application Data

(60) Provisional application No. 63/085,990, filed on Sep. 30, 2020.

(51) Int. Cl.
*G06F 16/33* (2019.01)
*G06Q 30/08* (2012.01)
*G06F 16/332* (2019.01)

(52) U.S. Cl.
CPC ........ *G06F 16/3335* (2019.01); *G06F 16/334* (2019.01); *G06F 16/3329* (2019.01); *G06Q 30/08* (2013.01)

(58) Field of Classification Search
CPC ............... G06F 16/3335; G06F 16/334; G06F 16/3329; G06F 16/2428; G06Q 30/08
See application file for complete search history.

(56) References Cited

U.S. PATENT DOCUMENTS

| 7,542,978 B2 | 6/2009 | Ortega et al. |
| 7,904,343 B2 | 3/2011 | Brader-Araje et al. |

(Continued)

FOREIGN PATENT DOCUMENTS

| JP | 2006201982 A | 8/2006 |
| WO | 0139095 A2 | 5/2001 |
| WO | 0169506 A2 | 9/2001 |

OTHER PUBLICATIONS

AutoTempest Review: Pros and Cons—Best Place to Buy a Used Car? https://www.compare.com/ways-to-save/vehicle/autotempest-review, 2021, 8 pgs.

(Continued)

*Primary Examiner* — Mark D Featherstone
*Assistant Examiner* — Ranjit P Doraiswamy
(74) *Attorney, Agent, or Firm* — Bekiares Eliezer LLP

(57) ABSTRACT

The present disclosure generally relates to the connection, operation, automation, and autonomation of disparate computing systems, networks, and databases. The present disclosure further relates to a method for operating a plurality of legacy systems, comprising: receiving a user input string from a user; parsing the user input string into a plurality of terms; generating, for each of the plurality of legacy systems, based on the user input string, one or more legacy input strings, each of the one or more legacy input strings being executable by each of the plurality of legacy systems and comprising a syntactical arrangement of one or more of the plurality of terms; and instructing the plurality of legacy systems to execute the one or more legacy input strings.

20 Claims, 21 Drawing Sheets

(56) References Cited

U.S. PATENT DOCUMENTS

| | | | |
|---|---|---|---|
| 8,818,881 | B2 | 8/2014 | Himmerick et al. |
| 9,466,079 | B2 | 10/2016 | Hygema et al. |
| 9,652,790 | B2 | 5/2017 | Anand et al. |
| 9,697,565 | B2 | 7/2017 | Friedman et al. |
| 9,736,269 | B2 | 8/2017 | Liu et al. |
| 9,767,511 | B2 | 9/2017 | Montgomery |
| 9,984,401 | B2 | 5/2018 | Taira et al. |
| 10,467,686 | B2 | 11/2019 | Simmons et al. |
| 10,810,659 | B2 | 10/2020 | Hilliard et al. |
| 2002/0029185 | A1 | 3/2002 | Tanaka et al. |
| 2002/0049664 | A1 | 4/2002 | Hoffman et al. |
| 2003/0130966 | A1 | 7/2003 | Thompson et al. |
| 2004/0054812 | A1* | 3/2004 | Liang .............. G06Q 10/087 709/250 |
| 2007/0094300 | A1* | 4/2007 | Abnous ............ G06F 16/972 |
| 2007/0214075 | A1 | 9/2007 | Ablan |
| 2009/0037483 | A1* | 2/2009 | Christensen ........... G06F 8/51 |
| 2013/0041781 | A1 | 2/2013 | Freydberg |
| 2014/0195514 | A1* | 7/2014 | Stein ................ G06F 16/256 707/722 |
| 2014/0279275 | A1 | 9/2014 | Burgiss et al. |
| 2014/0324503 | A1* | 10/2014 | Whittaker ............ G06Q 50/01 705/7.19 |
| 2014/0351074 | A1 | 11/2014 | Enge et al. |
| 2015/0058152 | A1 | 2/2015 | Pollak et al. |
| 2015/0310466 | A1 | 10/2015 | LaCivita et al. |
| 2017/0013046 | A1* | 1/2017 | Flynn .................. H04L 67/06 |
| 2017/0061529 | A1 | 3/2017 | Sweeder et al. |
| 2020/0118203 | A1 | 4/2020 | Sweeder et al. |
| 2020/0134709 | A1 | 4/2020 | Lewison et al. |
| 2020/0211097 | A1* | 7/2020 | Benson ............ G06Q 30/0623 |

OTHER PUBLICATIONS

AutoTempest—Wikipedia (Last Edited on Dec. 28, 2020), Apr. 12, 2021, 1 pg.

Search New and Used Cars for Sale—Trovit, https://cars.trovit.com, Apr. 12, 2021, 1 pg.

TrueCar | New & Used Cars for Sale | Car Pricing & Reviews, Find a Great Price on the Vehicle You Want, https://www.truecar.com, Apr. 12, 2021, 8 pgs.

EZ sniper : Free ebay auction sniper software. Snipe auctions online. Automatic esnipe bid sniping agent, https://www.ezsniper.com, 2001-2021, 2 pgs.

One-Stop Shop With ISearch.co, https://www.onesearch.co/cars/, Copyright © 2021 1Search.co (owned & operated by BirchBlue LLC), Search All Top Car Websites in One Click, 12 pgs.

Penny Auction Auto Bidding Bot | Bidder Robot, Automatic Bidder for Penny Auctions, www.bidderrobot.com, Apr. 12, 2021, 3 pgs.

New and Used Auto Dealership Management Software | vAuto, https://www.vauto.com, 2021 VAuto Inc., 10 pgs.

Stockwave Software Tour | vAuto, https://www.vauto.com/learning-center/all-content/stockwave-software-tour, Apr. 12, 2021, 2 pgs.

C. Priest, Algorithm Design for Agents Which Participate in Multiple Simultaneous Auctions, Jul. 2000, https://www.researchgate.net/publication/292055743_Algorithm_design_for_agents_which_participate_in_multiple_simultaneous_auctions, 9 pgs.

Patricia Anthony et al., Autonomous Agents for Participating in Multiple Online Auctions, May 2001, https://www.researchgate.net/publication/2363393_Autonomous_Agents_For_Participating_In_Multiple_Online_Auctions, Highfield, Southampton, UK, 9 pgs.

Morad Benyoucef et al., A Rule-Driven Approach for Defining the Behaviour of Negotiating Software Agents, Apr. 3-5, 2002, https://www.researchgate.net/publication/221281463_A_Rule-Driven_Approach_for_Defining_the_Behaviour_of_Negotiating_Software_Agents, Distributed Communities on the Web, 4th International Workshop, DCW 2002, Sydney, Australia, Revised Papers, 8 pgs.

BidStream | The Leading Native Advertising RTB Exchange, bidstream.com, Apr. 12, 2021, 3 pgs.

* cited by examiner

| Search | Prefix | Example |
|---|---|---|
| Make | make: | make:Ford |
| Model | model: | model:E150 |
| Color | color: | color:green |
| Year | > < - + | <2005 or 2005-2010 |
| Odometer | > < - + | >20000 or 10000+ |
| Lane | lane: | lane:1x |
| Run # | run: | run:1x-30 |
| Buyer Name | buyer: | buyer:herron |
| Seller Name | seller: | seller:warren |
| Condition Report | cr: | cr:yes or cr:no |
| Photos | photos: | photos:5 or photos:0 |

| | | | |
|---|---|---|---|
| VEHICLE | SALE | COMPANY | X |
| Search | Finds | Example | |
| Sale Date Offset | saledate: | saledate:10 | |
| Check-In Offset | checkindate: | checkindate:3 | |
| Lane | lane: | lane:1 x | |
| Run # | run: | run:1 x-30 | |
| Status | status: | status:sold, status:inventory, status:arbitration, status:consigned, or status:in-sale | |

Advanced Search Tips

CLICK HERE FOR A LIST OF ALL SEARCH TERMS

For a better experience, try some of the search tips listed here. Or enter a stock #, customer account #, or type a word or name to search by, such as Ford or Auto Sales or Smith.

*FIG. 8*

| Vehicle | Buyer | Amount | Seller | Floor | Status |
|---|---|---|---|---|---|
| 2008 MITSUBISHI RAIDER LS (766260) | | $2,650 | | 1 | Sold: $2,650 |
| 2014 GMC ACADIA SLE (766122) | | $8,000 | | 1 | Sold: $8,000 |
| 2012 FORD F150 XLT (766677) | | $12,500 | | 1 | Sold: $12,500 |
| 2004 TOYOTA COROLLA LE (766038) | | $1,750 | | 1 | Sold: $1,750 |
| 2007 FORD FUSION SEL (766823) | | $1,000 | | 1 | Sold: $1,000 |
| 2008 DODGE RAM 2500 SLT (766728) | | $12,800 | | 1 | Sold: $12,800 |
| 2006 FORD ESCAPE XLT (766832) | | $1,200 | | 1 | Sold: $1,200 |
| 2013 BMW 5-SERIES 528XI (766936) | | $10,000 | | 1 | Sold: $10,000 |
| 2011 FORD F150 XLT (767169) | | $4,600 | | 1 | Sold: $4,600 |
| 2012 NISSAN ROGUE S (766991) | | $3,800 | | 1 | Sold: $3,800 |
| 2013 FORD F150 XLT (767805) | | $8,500 | | 1 | Sold: $8,500 |
| 2008 LEXUS RX 350 (767807) | | $6,600 | | 1 | Sold: $6,600 |

PROTOCOL, METHODS, AND SYSTEMS FOR AUTOMATION ACROSS DISPARATE SYSTEMS

RELATED APPLICATION

Under provisions of 35 U.S.C. § 119(e), the Applicant claims the benefit of U.S. Provisional Application No. 63/085,990, filed Sep. 30, 2020, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to protocols, methods, platforms, and systems for unified interaction with or automation across technically disparate systems.

BACKGROUND

In some situations, a user would like to interact with a plurality of related but disparate systems. For example, a user may be trying to compare, manipulate, or select data from a variety of disparate data systems having different technical requirements. Thus, the conventional strategy is to interact with each system individually. This often causes problems because the conventional strategy is time consuming, limits simultaneously available information to a user, and requires the user to individually meet the different technical requirements of each system. For example, car auction data is located on many disparate legacy systems which have different technical requirements and syntax. Conventionally, a user must understand the different technical and syntactical requirements and individually query each system accordingly.

It should be understood that examples mentioned in the present description, such as methods related to car auction systems, only reflect a portion of the context to which the present disclosure pertains. Problems addressed by the embodiments disclosed also occur in a variety of other contexts. Background information provided in the context of car auction systems is provided only for contextual reference to certain use cases to which the various embodiments in the present disclosure may apply. Other use cases may generally include, but are not limited to, hotel systems, restaurant systems, ticketing systems, or any other system having data metrics related to goods or services.

As an example, motor vehicle auctions have become a popular way for motor vehicle dealers to add to their inventory of used vehicles which are sold at retail at their locations. Accordingly, several motor vehicle auction companies sell pre-owned vehicles. The pre-owned vehicles are assembled on one or more motor vehicle auction facilities, airports, storage locations or dealer lots. These pre-owned vehicles are consigned by motor vehicle manufacturers, rental car companies, commercial fleet companies, financial institutions, and motor vehicle dealers. These auctions are managed by auction personnel who do a wide variety of functions. These functions comprise the various components of the wholesale motor vehicle auction process.

In the past, full and effective management of an auction has meant that auction management personnel had to predominantly be onsite at a physical location to obtain data, manage assets, make decisions, conduct the auctions, settle accounts and transfer titles. Existing computerized auction management software (electronic auction management software) requires auction personnel to be predominantly onsite at a physical location for the full and effective management of the auction.

There are motor vehicle auction companies that have ownership in more than one auction business or locations. These locations may be physical or online locations. There are auction personnel required to manage more than one auction business or locations. These locations may be physical or online locations. In the past, full and effective management requires owners and auction personnel to learn and work with multiple types of computerized auction management software systems. Even when the auction businesses or locations use the same brand of software, there are numerous permutations, customizations, and differences across the computerized auction management software.

In a commercial motor vehicle auction in the past, a representative of the motor vehicle dealer must personally visit the motor vehicle auction site to participate in the motor vehicle auction. This requirement adds to the expense of purchasing vehicles in the motor vehicle auction and slows the auction process down. The existing systems do not address all the needs of motor vehicle auction operators or participants.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure generally relates to the connection, operation, automation, and autonomation of disparate computing systems, networks, and databases. Protocols, methods, systems, and platforms as disclosed herein are, by way of non-limiting example, applicable to universal protocols for facilitating or allowing a user to use disparate legacy systems, operational visual cards and methods for generating custom queries or graphical user interface elements, rules engines or implemented actions for making determinations related to queries, results, or graphical user interface elements are handled, recommendation engines for making recommendations related to queries, results, or graphical user interface elements, and machine learning or autonomous operation to automatically optimize or generate queries, results, or graphical user interface elements.

The present disclosure further relates to a method for operating a plurality of legacy systems, comprising: receiving a user input string from a user; parsing the user input string into a plurality of terms; generating, for each of the plurality of legacy systems, based on the user input string, one or more legacy input strings, each of the one or more legacy input strings being executable by each of the plurality of legacy systems and comprising a syntactical arrangement of one or more of the plurality of terms; and instructing the plurality of legacy systems to execute the one or more legacy input strings.

Both the foregoing brief overview and the following detailed description provide examples and are explanatory only. Accordingly, the foregoing brief overview and the following detailed description should not be considered restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Embodiments of the present disclosure provide a hardware and software platform operative by a set of methods and computer-readable media comprising instructions configured to operate the modules and computing elements referenced herein in accordance with the methods. The following drawings may depict an example of at least one method of a plurality of methods that may be performed by at least one of the aforementioned modules. Various hardware components may be used at the various stages of operations disclosed with reference to each module.

Figure 1:
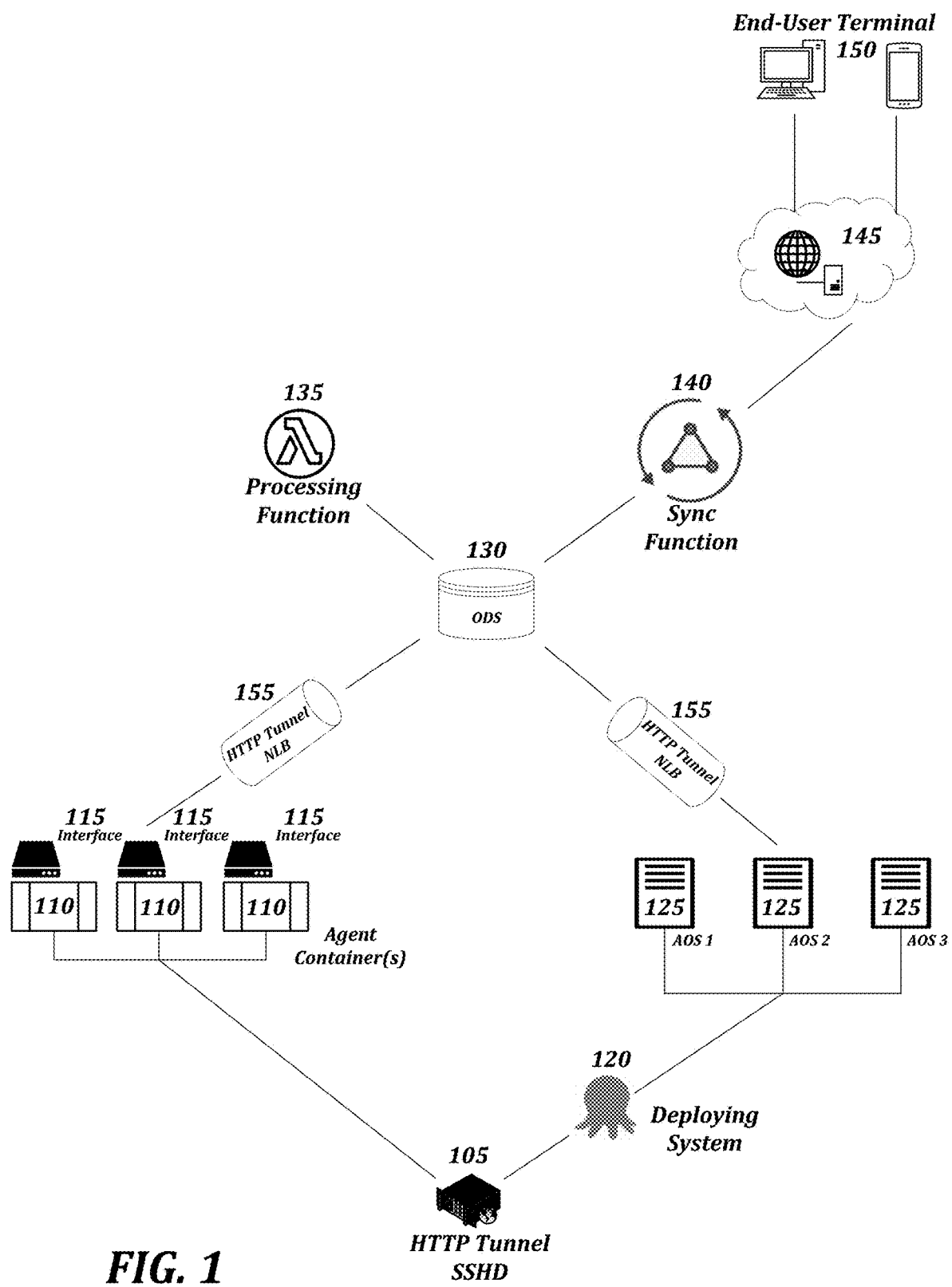
Figure 3:
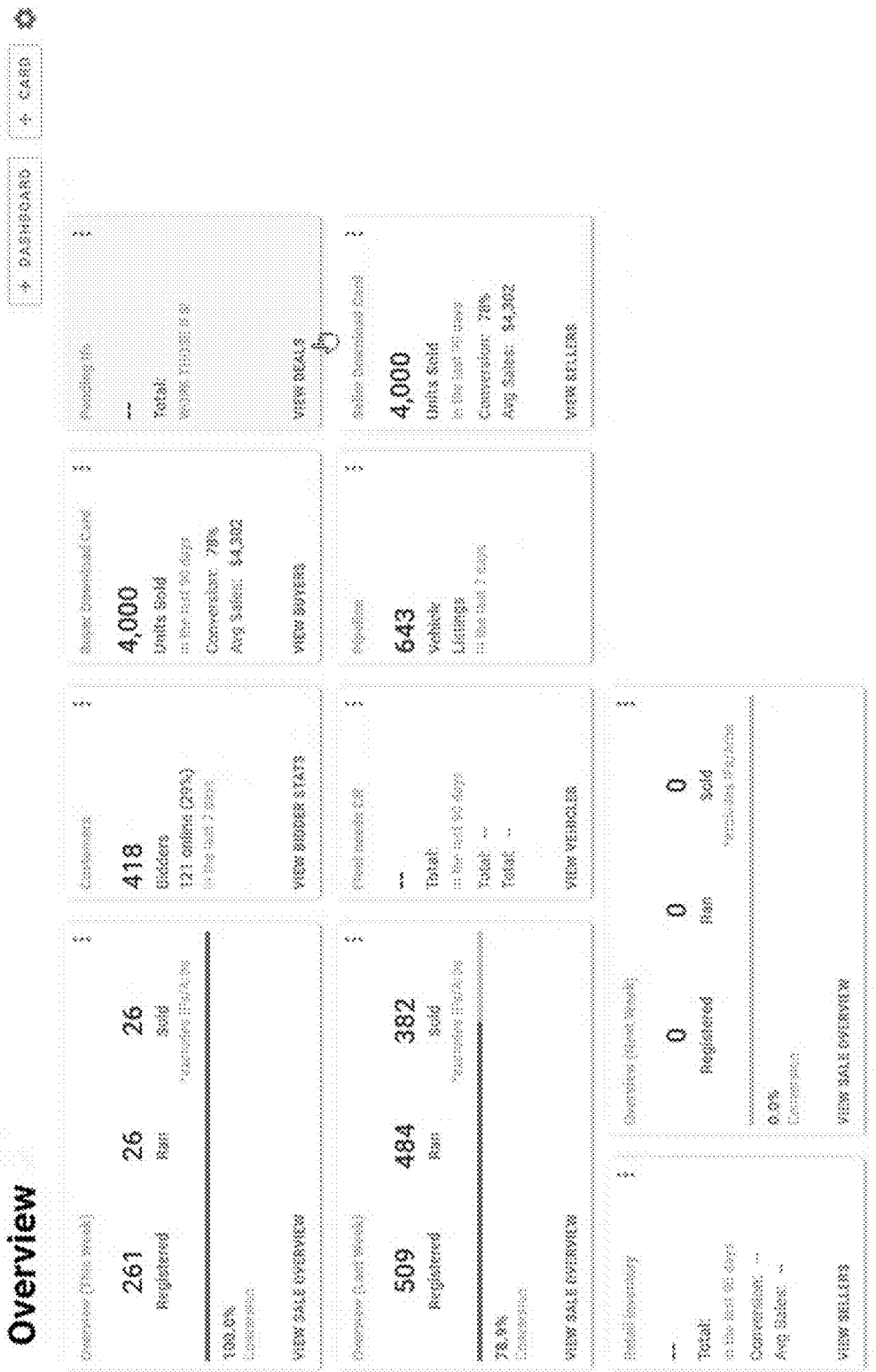
Figure 4:
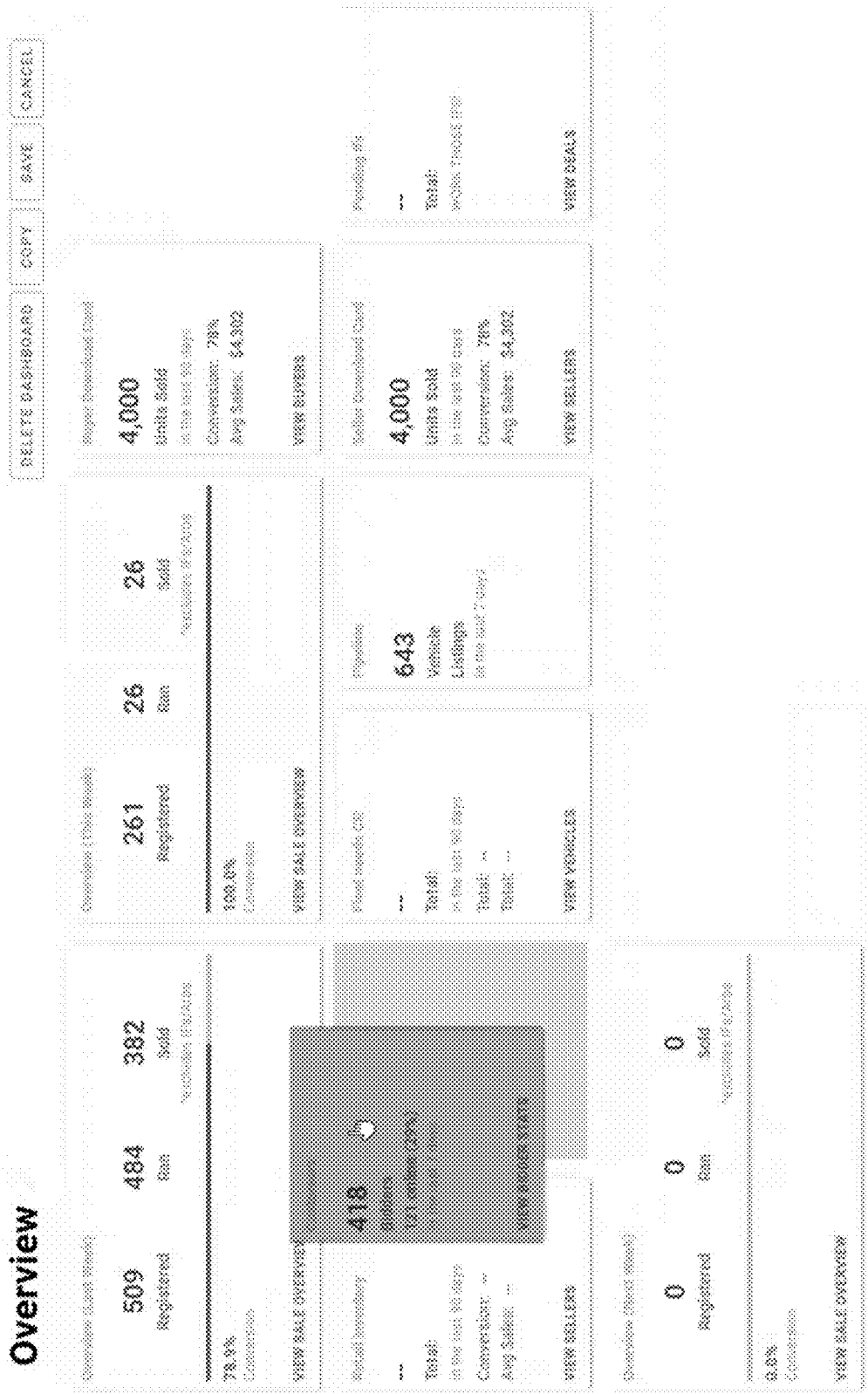
Figure 5:
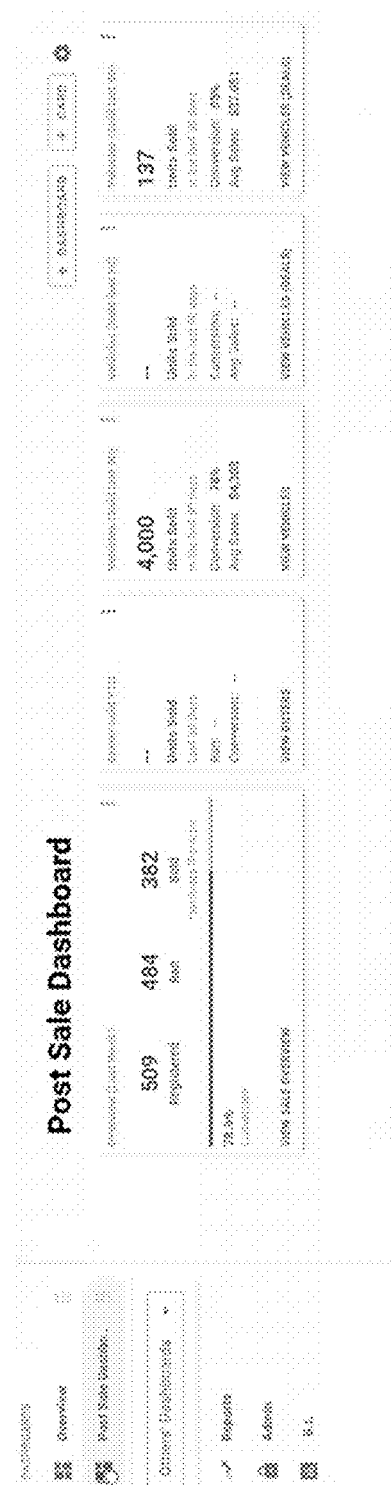
Figure 7:
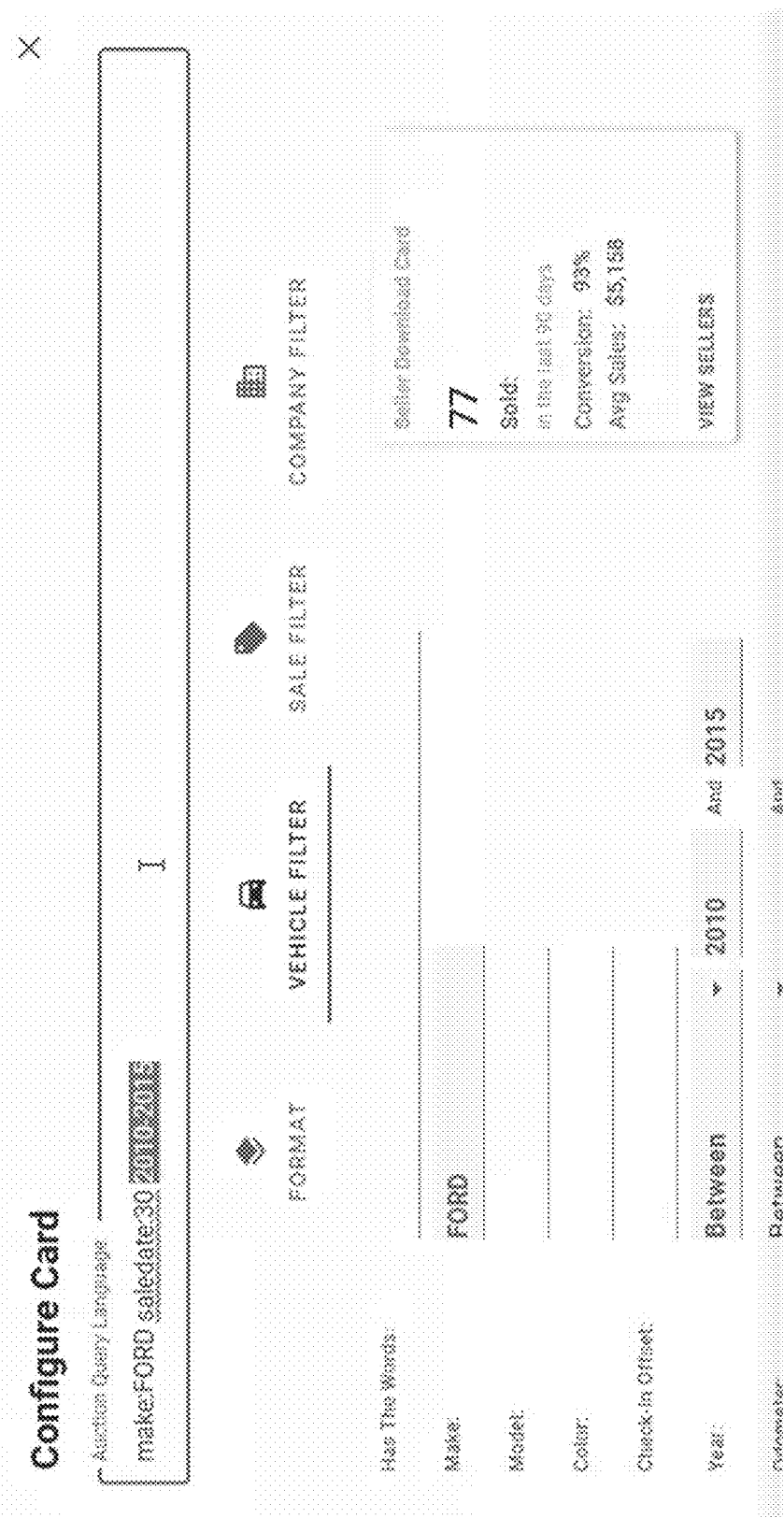
Figure 9:
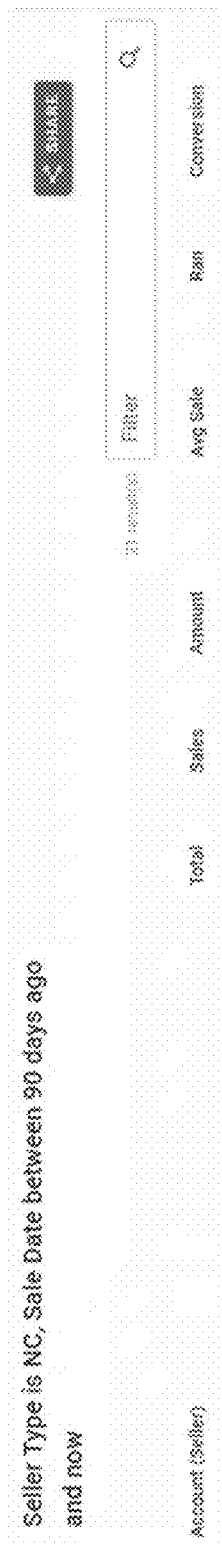
Figure 10:
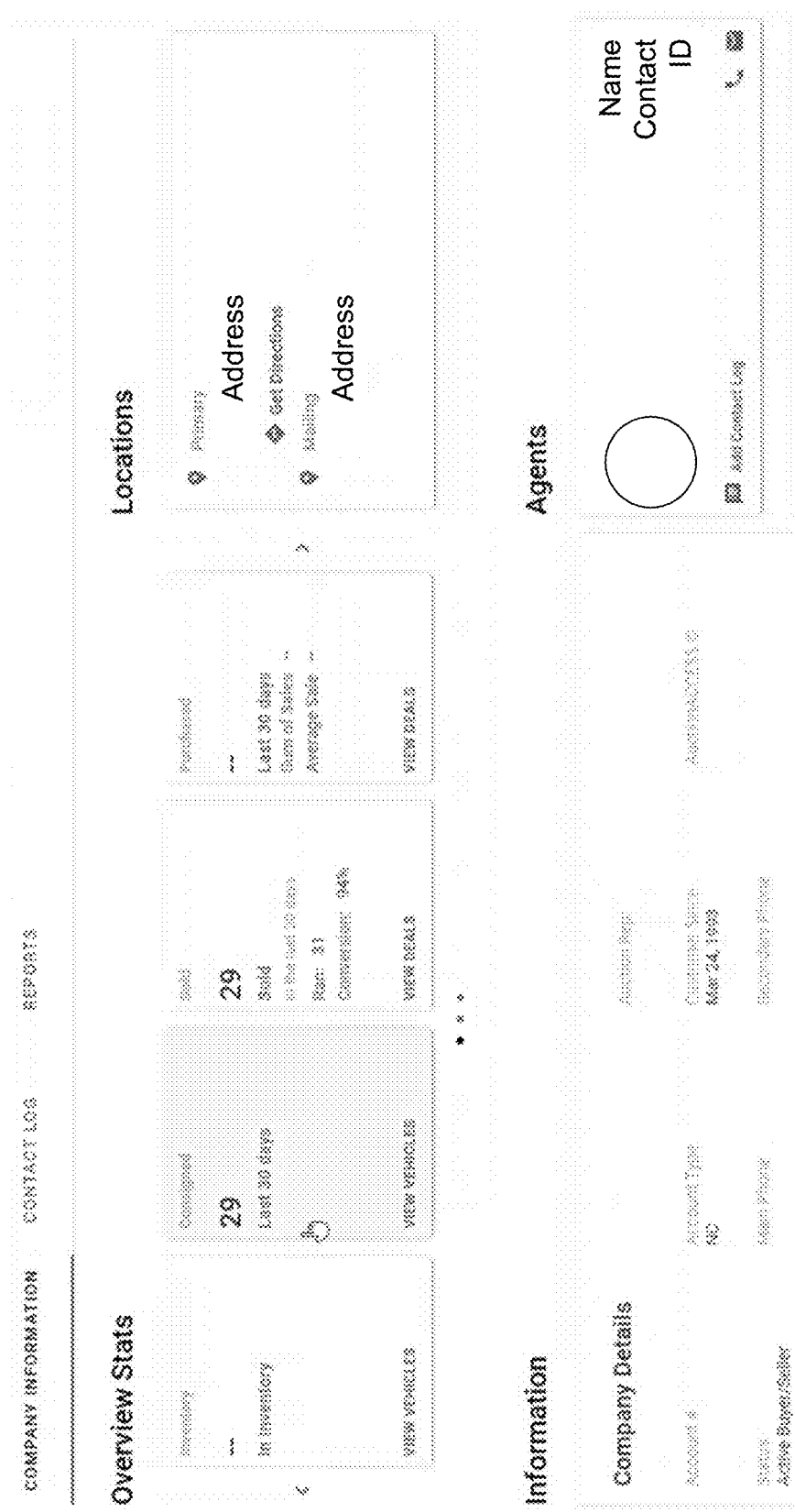
Figure 13:
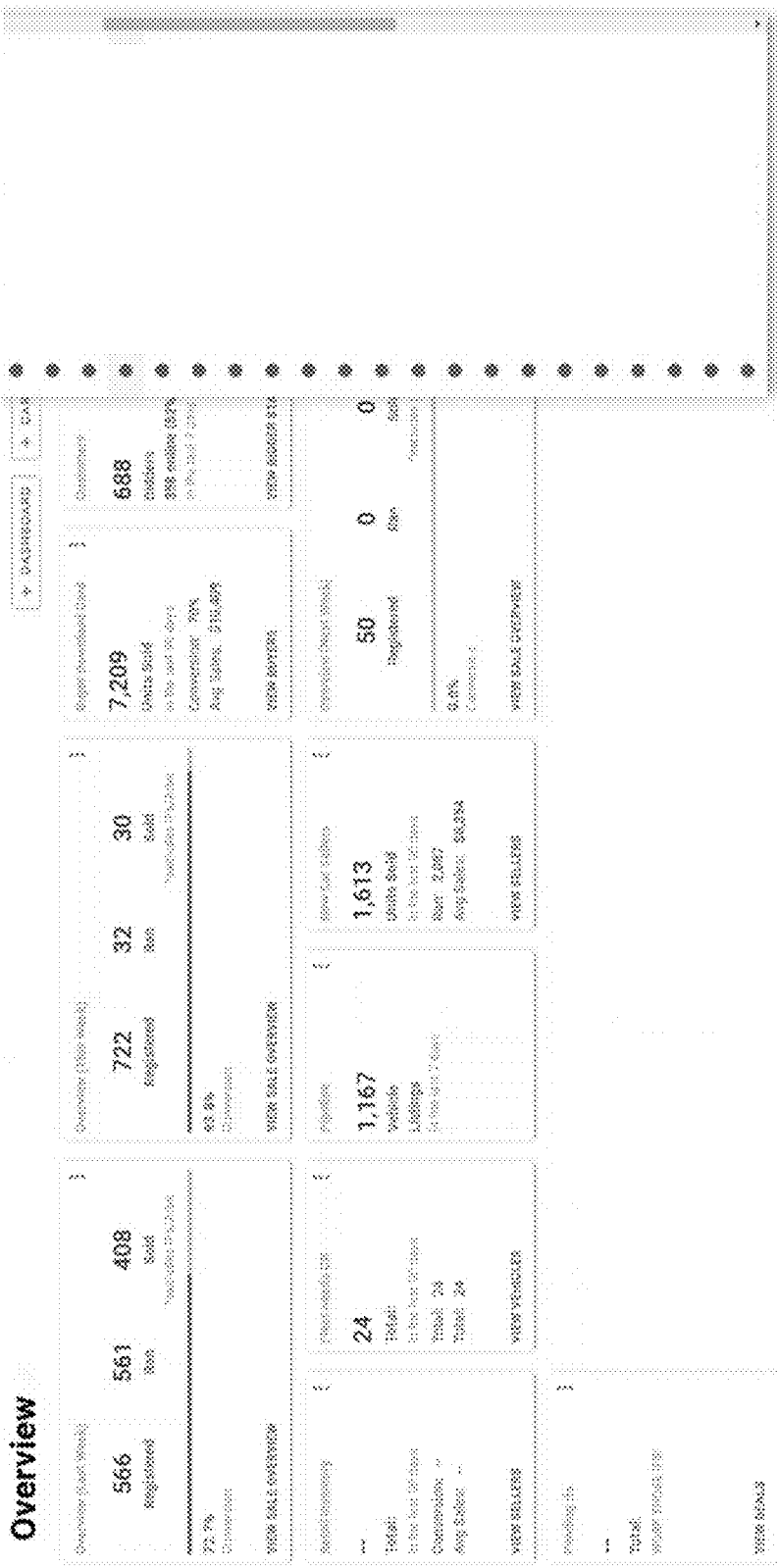
Figure 14:
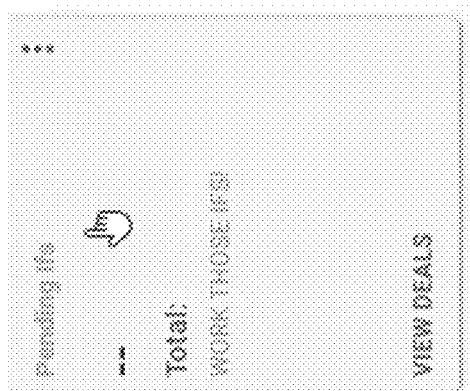
Figure 15:
Figure 16:
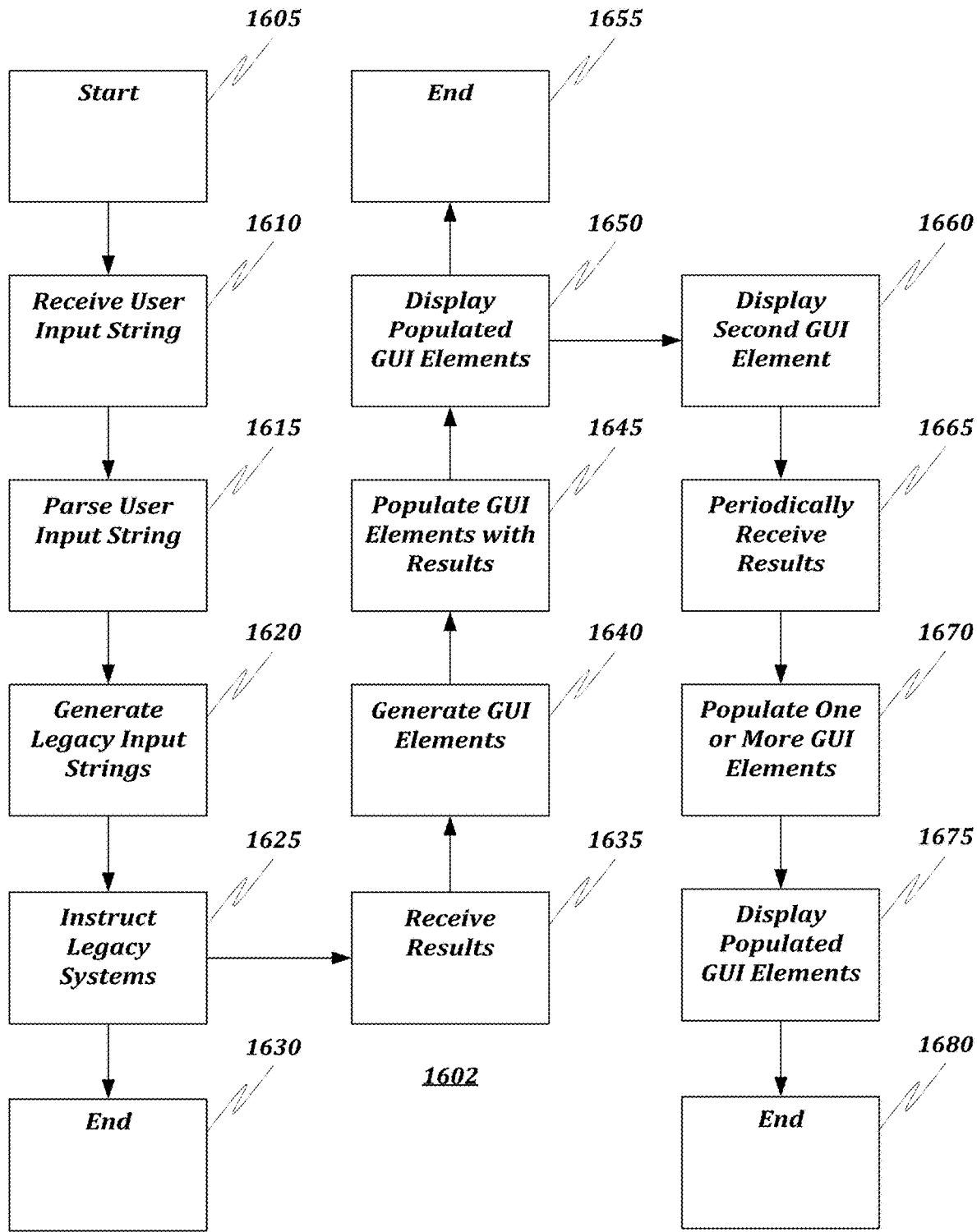
Figure 17:
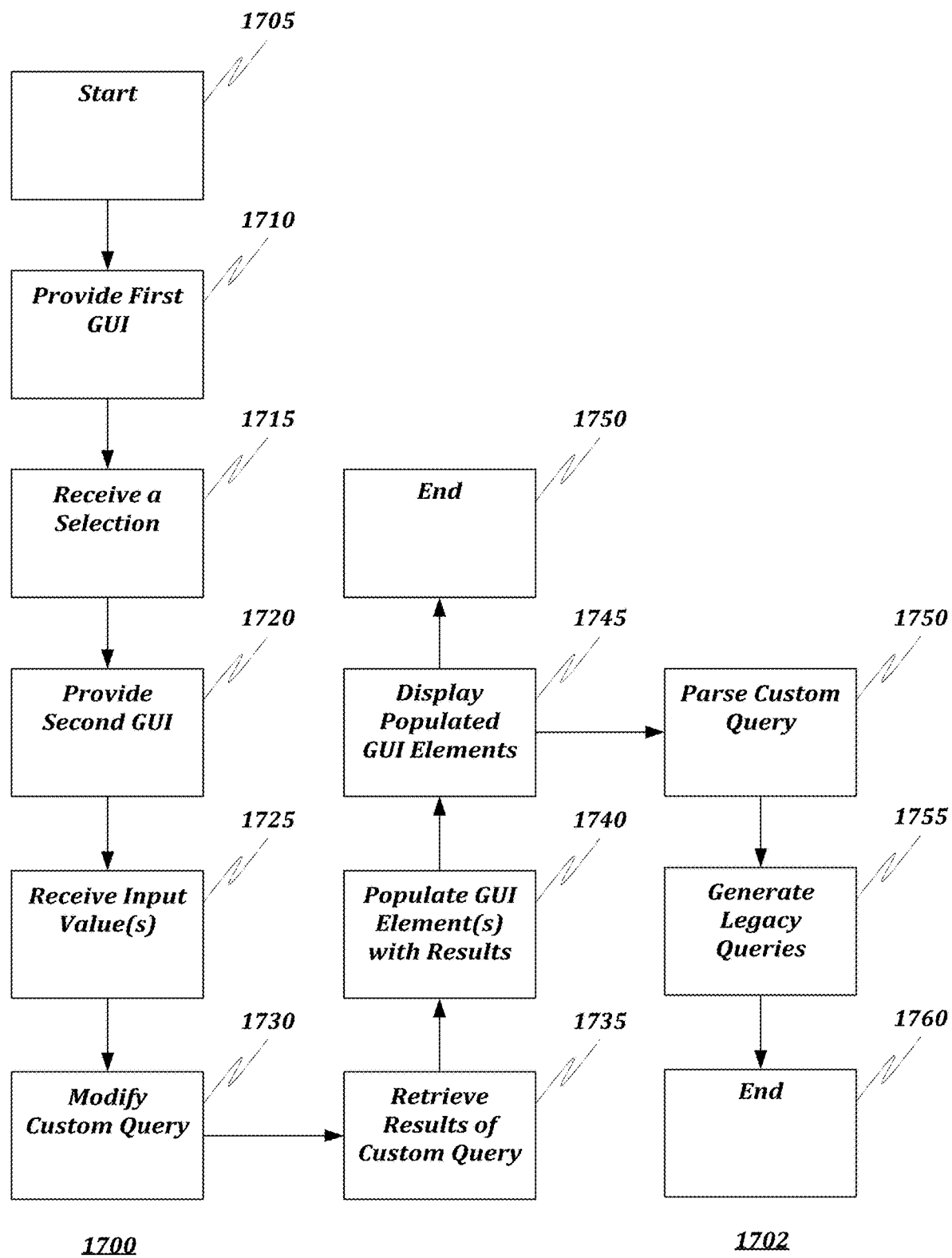
Figure 18:
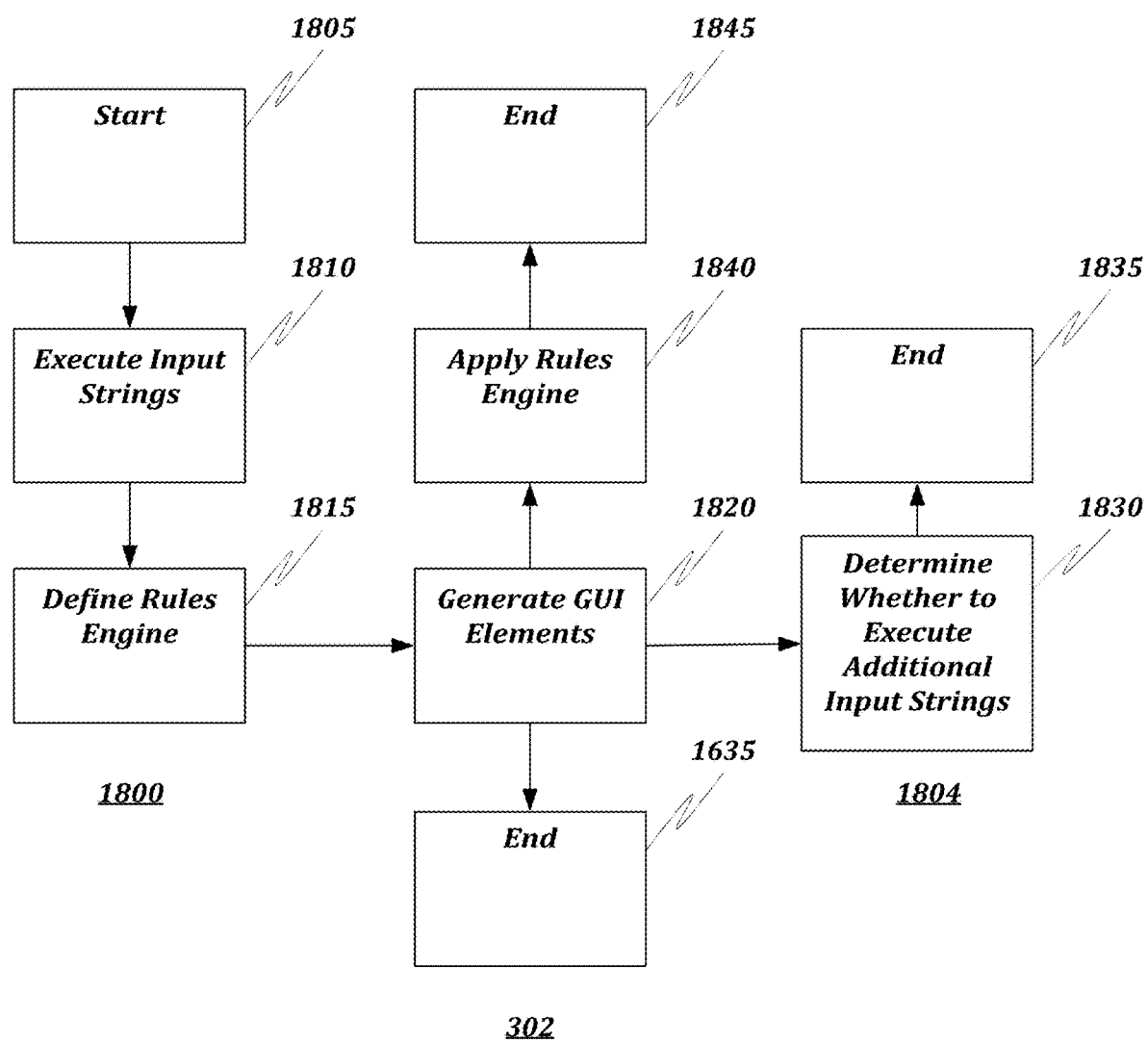
Figure 19:
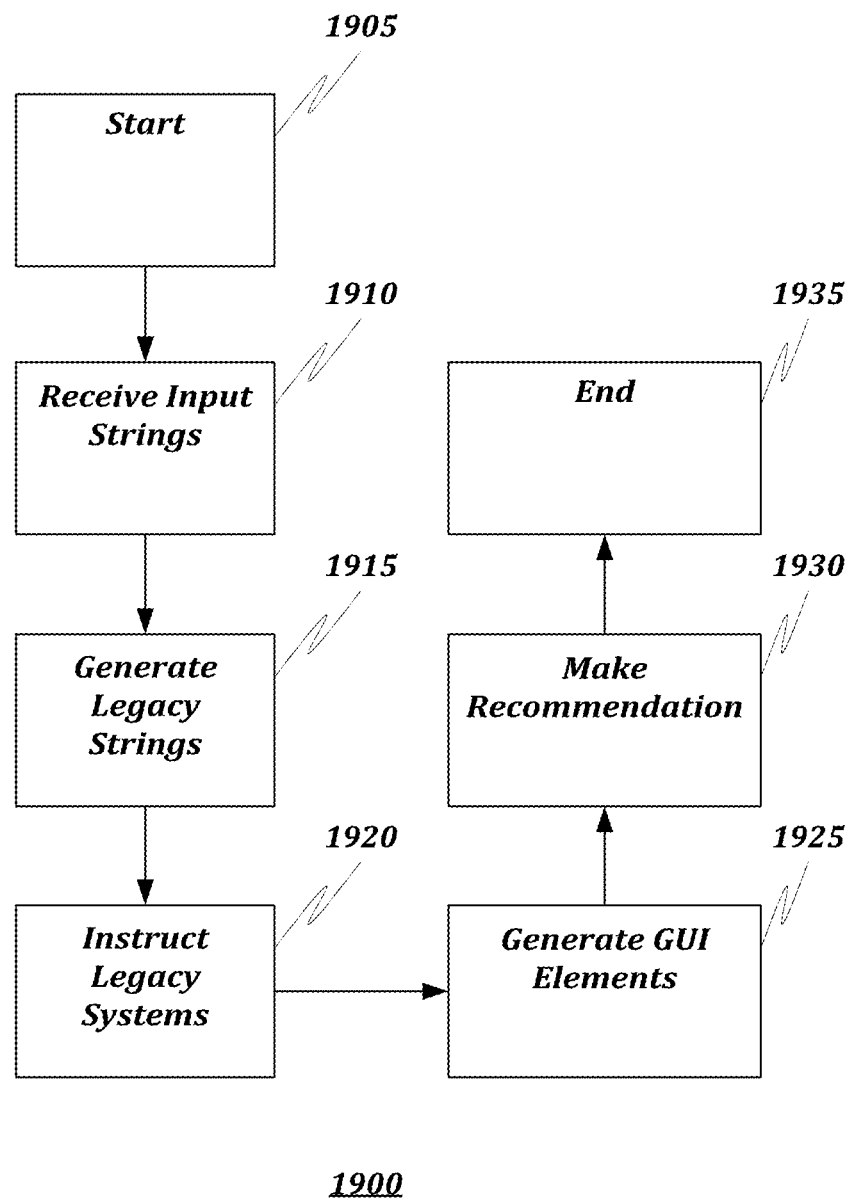
Figure 20:
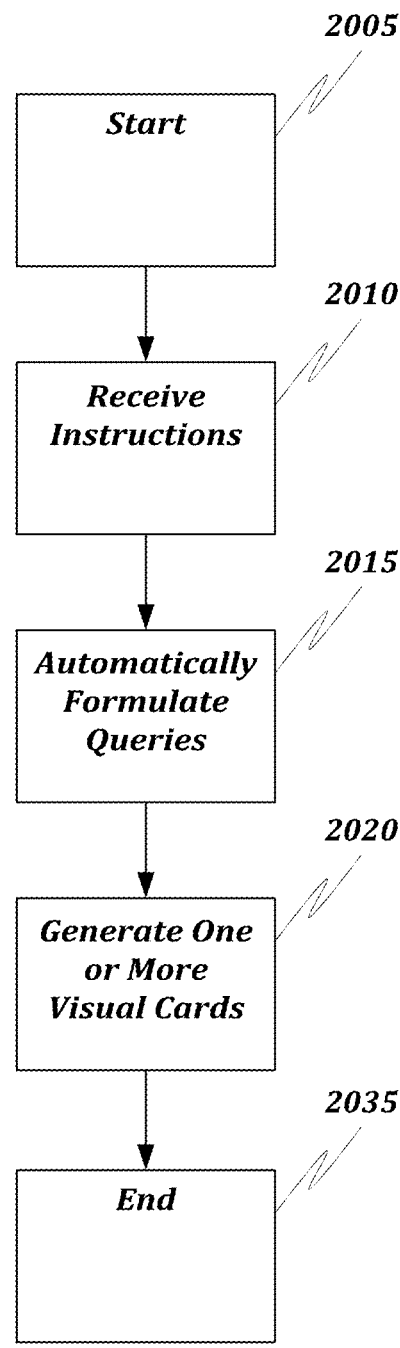

Furthermore, the drawings may contain text or captions that may explain certain embodiments of the present disclosure. This text is included for illustrative, non-limiting, explanatory purposes of certain embodiments detailed in the present disclosure. In the drawings:

FIG. 1 illustrates one possible operating environment through which a platform consistent with embodiments of the present disclosure may be provided;

FIG. 2 illustrates parameters, prefixes and example use;

FIG. 3 illustrates an example user interface;

FIG. 4 illustrates an operation that enables a user to relocate a location of a GUI element;

FIG. 5 illustrates an addition dashboard of GUI elements;

Figure 6:
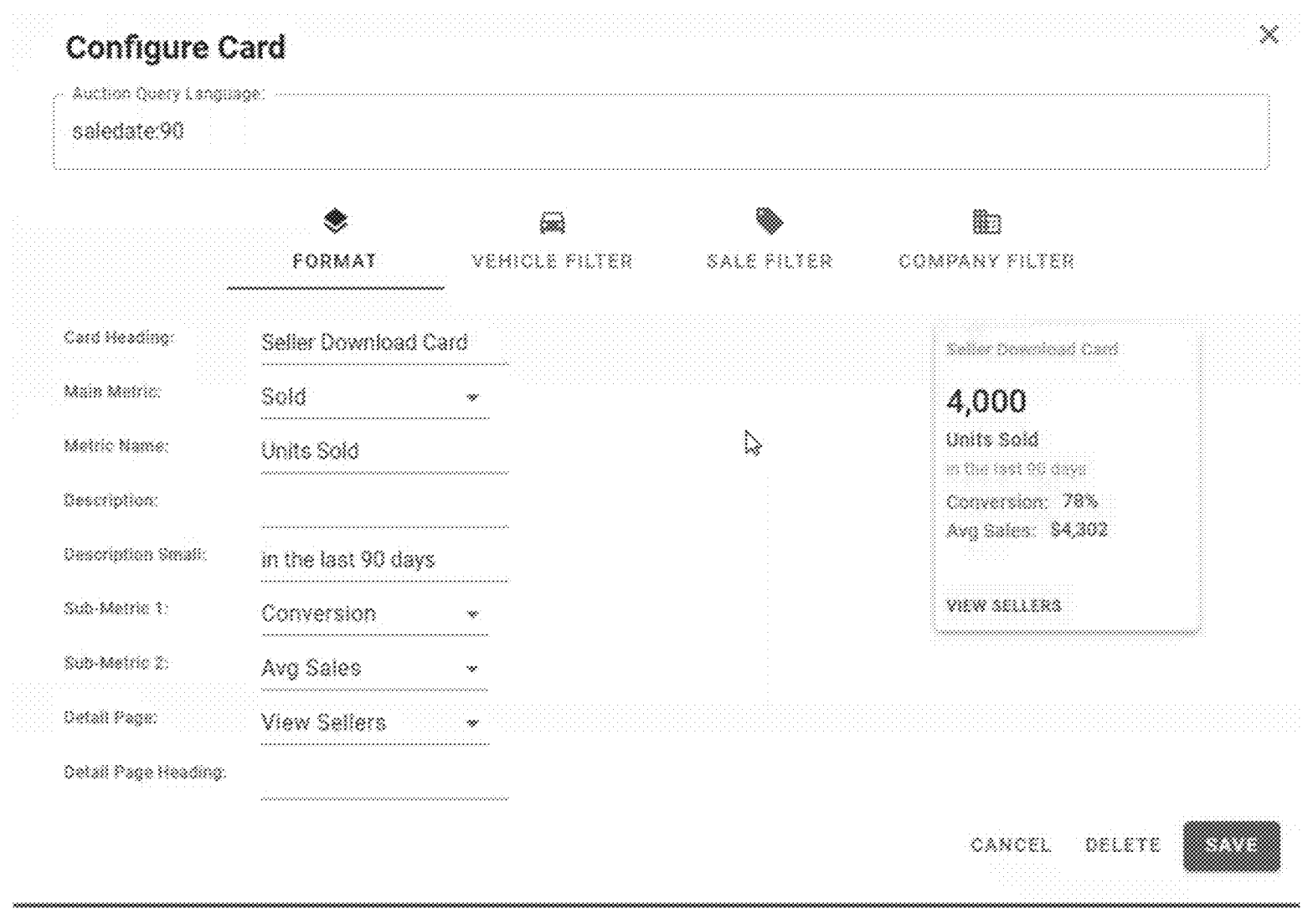

FIG. 6 illustrates a GUI for configuring a GUI element within the dashboard;

FIG. 7 illustrates graphical elements and textual input of a GUI element within the dashboard;

FIG. 8 illustrates a graphical element having pre-defined terms;

FIG. 9 illustrates a graphical element having the results of a query;

FIG. 10 illustrates a graphical element having detailed view of a seller;

FIG. 11 illustrates a graphical element having a list of results for a query;

Figure 12:
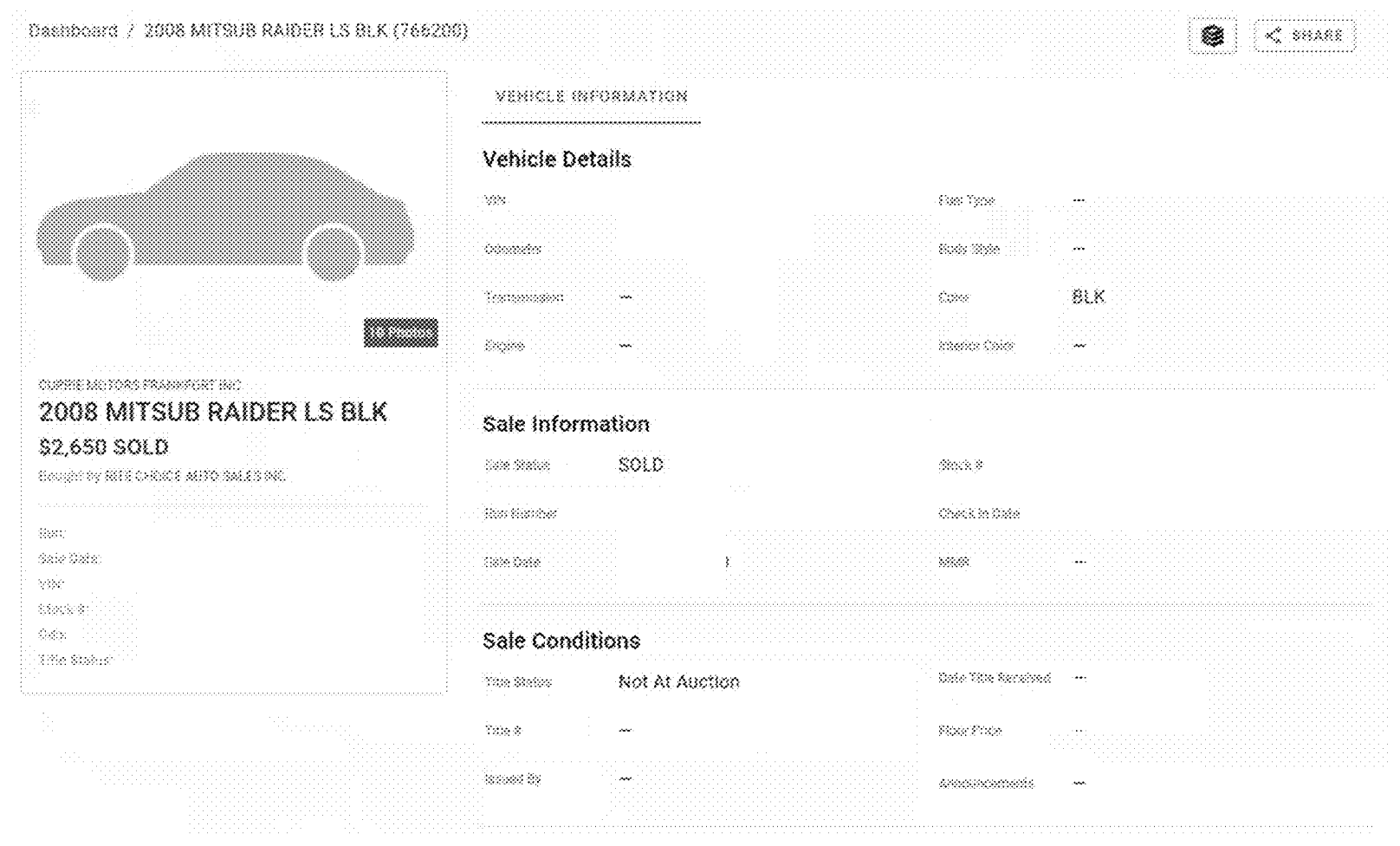

FIG. 12 illustrates a graphical element representing a result;

FIG. 13 illustrates a graphical interface as disclosed herein;

FIG. 14 illustrates a "Pending IF" GUI element;

FIG. 15 illustrates a UI that may take actions on behalf of the user;

FIG. 16 is a flow chart of a method for providing a universal protocol;

FIG. 17 is a flow chart of a method for providing a graphical user interface;

FIG. 18 is a flow chart of a method for providing a rules engine;

FIG. 19 is a flow chart of a method for providing a recommendation engine;

FIG. 20 is a flow chart of a method for providing machine learning; and

Figure 21:
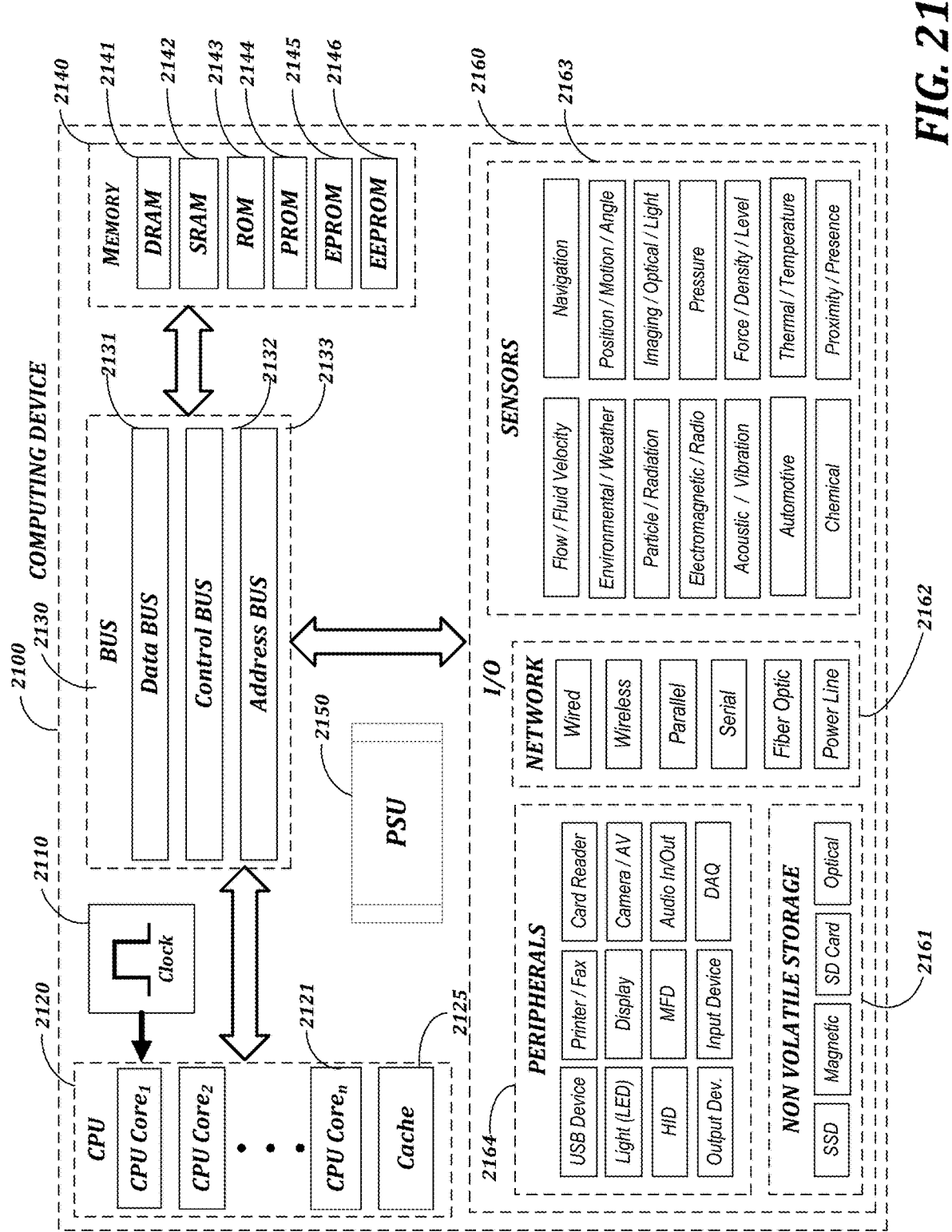

FIG. 21 is a block diagram of a system including a computing device for performing various methods disclosed herein.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of car auction systems, embodiments of the present disclosure are not limited to use only in this context. Rather, the present disclosure provides a technical infrastructure and methodology that may be adapted in deployed in various industries and operating environments not limited to car auction systems. The present disclosure may further be used to connect with modern applications and/or non-legacy applications, thereby making legacy and non-legacy all accessible and usable in one platform and/or system for a user.

It is noted that the term "auction system" and the like may refer to and/or be embodied as, but not limited to, a system configured to sell vehicles (or other commodities) via an auction process, and/or a system used by auction houses i.e., auction as a company as compared to a process, to manage and run the operations and/or businesses.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

In a first aspect, the present disclosure relates to the provision of a universal protocol for bi-directionally operating the disparate computing systems, networks, and databases.

In a second aspect, the present disclosure relates to a query-based database language for instructing the universal protocol for bi-directionally operating the disparate computing systems, networks, and databases.

In a third aspect, the present disclosure relates to a graphical user interface (GUI) for providing structured and actionable visual representations of the disparate computing systems, networks, and databases.

In a fourth aspect, the present disclosure relates to a rules engine configured to define conditions for executing one or more actions for affecting an operation of the disparate computing systems, networks, and databases.

In a fifth aspect, the present disclosure relates to a rules engine configured to execute the one or more actions for affecting an operation of the disparate computing systems, networks, and databases.

In a sixth aspect, the present disclosure relates to a recommendation engine configured to, by way of non-limiting example, monitor, analyze, project, optimize, define, and execute one or more actions for affecting an operation of the disparate computing systems, networks, and databases.

In a seventh aspect, the present disclosure relates to machine learning methods and systems for the autonomous or quasi-autonomous provision and control of various aspects in the disparate computing systems, networks, and databases.

In an eighth aspect, the present disclosure relates to, by way of non-limiting example, auctions.

In a ninth aspect, the present disclosure relates to, by way of non-limiting example, commercial motor vehicle auctions and/or noncommercial vehicle auctions.

In a tenth aspect, the present disclosure relates to, an auction in a person entity may purchase or sell one or more items which have been assembled at one or more remote locations.

In an eleventh aspect, the present disclosure relates to, an auction in which motor vehicle dealers purchase at auction pre-owned motor vehicles which have been assembled at one or more remote locations by a motor vehicle auction company.

In a twelfth aspect, this present disclosure relates to information systems and networks that enable the auction process and provide auction users access to auction-related data, including, but not limited to, auction operations related data and data relating to the auction process.

In a thirteenth aspect, the present disclosure relates to information systems and networks that enable a user to use auction data to manage transactions related to an auction.

In a fourteenth aspect, the present disclosure relates to information systems and networks that enable the motor vehicle auction process and provide auction user participants access to auction-related data and use that data to manage transactions and run their business operations regarding the buying/selling of vehicles.

In a fifteenth aspect, the present disclosure relates to a standard layer across all auction management software systems (or any other industry vertical) becoming a single system for auction owners and auction personnel to use across businesses and locations.

In a sixteenth aspect, the present disclosure relates to a domain specific syntax for using the system, which may be referred to herein as Auction Query Language™ or AQL™ but need not be limited to any particular service, product, or entity.

In a seventeenth aspect, the present disclosure may provide a syntax comprised of common language terms familiar to auction personnel in an interface for using an electronic computerized auction management system.

In an eighteenth aspect, the present disclosure may enable an auction system management user to employ the syntax in step by step interfaces to create shortcuts to relevant information and features associated with disparate computing systems, networks, and databases.

The aforementioned aspects are a non-limiting, and non-exhaustive, illustrative sample of the various embodiments that are disclosed, or may be logically derived, to be within the spirit and scope of the present disclosure. Both the foregoing brief overview and the following detailed description provide examples and are explanatory only. Accordingly, the foregoing brief overview and the following detailed description should not be considered restrictive. Further, features or variations may be provided in addition to those set forth herein. For example, embodiments may be directed to various feature combinations and sub-combinations described in the detailed description.

Individually, or in any reasonable combination, any one or more of the aspects disclosed herein may provide for an improved technical function of a legacy system in a multi-node auction network comprised of a plurality of disparate auction systems.

Embodiments of the present disclosure may be configured to track a behavior on the network of auctions and where vehicles or buyers/sellers (both as nodes) attach (i.e., where they do business or congregate around/who does business (or feels comfortable doing business) with whom). There are attributes of specific nodes (See, for example, the overall theory of Network Homophily) which help determine which sellers bring cars to which auctions, and where different buyers go to buy cars. Proximity between buyers/sellers and auctions is one aspect. Size of an auction or buyer or seller is one aspect. Age of the auction is another, etc. As an aside, age also plays into the reputational aspects of an auction, as it does for a buyer or seller.

Through the use of the various embodiments disclosed herein, including data, automation and machine learning, across the network, the platform of the present disclosure may be configured to improve the behavior of nodes on the network. That is, it can override attributes such as proximity, size and age of a node (user, system, auction, buyer, seller, etc.) in order to provide an optimized outcome for that node that prevails against the network attributes that would normally drive a behavior. This provides a substantial technical advantage over conventional systems, where these same factors serve to limit the market and its capabilities to meet supply with demand. For example, a newer, smaller auction in a distant location can attract a seller or buyer that is farther away, and more established. That seller or buyer may usually do business locally and with older, more established auctions. The system provides the level of data, automation, and processes to make it more mutually efficient and more mutually profitable for that buyer or seller and that auction to do business with each other. Furthermore, players from across different networks may now be enabled to engage in commerce with subject vehicles from other networks.

The universal protocol of embodiments described herein enables creation of a network beyond traditional technical and business constraints. This opens up the market by creating a better network that can incorporate more nodes than traditionally possible and facilitate payments, sales, inventory updates, and other interaction between nodes.

Additional advantages include, but are not limited to, for example, the following illustrative, non-exhaustive list: remote functionality, easier to train, fewer people to manage an auction, greater visibility across a wide range of auctions, greater efficiency in the industry, cheaper to upkeep and maintain, easier to integrate with and evolve off of [faster innovation, faster speed to market with innovation].

Accordingly, embodiments of the present disclosure enable a user to generate queries, formulate rules, and take actions that are pushed down to a plurality of disparate systems that would not otherwise be operable by or accessible to the user. Furthermore, the platform of the present disclosure may assist the user by its ability to optimize parameters, recommend and take actions, based on a study of the disparate systems that would not otherwise be available or accessible to the user. The actions may include, for example, the bidding or purchasing of an item. Furthermore, the actions may include, for example, the modification of data associated with the item.

Auctions serve a wide range of customers. The range of customers is growing and the way auctions service the customers is fluid. Further, each auction or group of auctions operate differently. Auctions require a dynamic, easily customizable system to remain competitive. A system that may access legacy knowledge, bridge the current and future, giving them a flexible tool to keep competitive in a fast-changing marketplace, may provide a further technical advantage. Embodiments of the present disclosure may serve to transform a legacy software platform to a modern solution and be able to perform in smaller microservices.

As one non-limiting example, embodiments of the present disclosure may be embodied as Spark™, an electronic motor vehicle auction operating/management system.

The electronic motor vehicle auction operating/management system of the present disclosure may allow a user to sign on to a cloud network from a computing device. The remote user may then have access to a portal.

The portal may provide insights in the form of dashboards, results from queries that are customized for an industry, and operations to perform on the resulting data.

The dashboard may provide insights into operation and effectiveness of a business operation by showing the user a series of "cards" which may provide a statistic or may "ask" a question. The "questions" may comprise domain-specific knowledge needs or functions.

The user may further access a search engine from the dashboard. In the current example, the search engine consists of an "auction query language" with built-in custom search tailored specifically to the motor vehicle auction business.

The resulting answer to a search from a search engine may be provided to the user to give more meaningful information to the original insight/ask. The user may then be presented with a logical way to perform an operation and "act." These acts may be functions previously performed in a legacy platform, but now offered in an intuitive, predictable way that is customizable per user. The dashboard may further comprise analytics. The analytics may highlight trending benchmark comparisons against other operators and other peer groups within the business' industry.

Embodiments of the present disclosure may provide a portal that is intended to be an entry point, for example, for all Edge™ ("Edge") customers and partners to access Edge's products and services—extending the customers and partners existing Auction Management Systems and allows for a method to transition from legacy to modern/cloud architecture.

The focus on auction customers may be comprised of multiple areas, including, but not limited to:
Business Intelligence;
Customer Management System;
Auction Management System; and
Buyer inventory portal with bidding analytics.

In one example, the Spark™ ("Spark") suite of services may provide a mobile device-friendly web portal for a user. The web portal may request a user ID and password, then point a browser, phone or tablet to a URL and proceed to log in the user.

Spark may be configured as a cloud platform. The platform may be provided through a User Interface ("UI"), such as "Spark UI." Spark may be a source for new AMS-related services and features.

Core services in Spark may trace similar lines drawn by, for example, ASIExec™ including, but not limited to, dealership and vehicle search, view, edit, and reporting.

Spark may be configured to coordinate communication from the cloud back down to an entity's on-premises auction management system. For example, a user may comprise the ability to edit data in Spark and have it saved in a database at the respective auction. The resulting benefit may comprise improved accessibility of the user's customers and vehicles anywhere/anytime via a web browser or mobile device.

Spark may modernize and improve existing services. For example, DigiDoc™ and document management services in general, are a valued service provided at more than 125 auctions nationwide. Currently auction-related documents are may be stored on local storage at the physical site of auctions. Spark Document Repository ("Spark Repo") may comprise a Spark-based document management system built in a cloud environment ("Cloud"). Documents may be securely stored in the cloud where they may be accessed appropriately by customers, including, for example, via an online and/or mobile site that lists inventory, events and auctions across numerous, independently owned auctions such as, for example, EDGE Pipeline™ and/or an online or mobile site that lists inventory, events and auctions from auctions that generally share ownership, such as, for example, EDGE Lookout™. Similar to accessing and downloading bank and credit card statements, auctions and their dealer customers will also be able to do the same by leveraging Spark and other related EDGE platforms.

In another example, Spark Business Intelligence™ (BI) may enable easy access business intelligence. By providing advanced analytics and reporting, Spark BI may provide a user with the information needed to drive critical decision making at auctions and/or groups. Spark BI may provide graphs comprising interactivity, graphics, and colors, and data which may allow a user to focus to answer more detailed questions about a business.

Embodiments of the present disclosure may comprise methods, systems, and a computer readable medium comprising, but not limited to, at least one of the following:
A. A Dashboard Module;
B. A Configure Card Module;
C. A Query Language Module;
D. A Results and Reports Module;
E. A Seller Information Module;
F. A Vehicle Information Module;
G. A Legacy System Communication Module; and
I. A Computing Device.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The following depicts example methods of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 2100 may be employed in the performance of some or all of the stages disclosed with regard to the methods. Similarly, an apparatus may be employed in the performance of some or all of the stages of the methods. As such, the apparatus may comprise at least those architectural components as found in computing device 2100.

Furthermore, although the stages of the following example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, methods may be performed by at least one of the modules disclosed herein. The methods may be embodied as, for example, but not limited to, computer instructions, which when executed, perform the method.

A first method may comprise the following stages for operating a plurality of legacy systems:
receiving a user input string from a user;
parsing the user input string into terms; and, for each legacy system:
generating, based on the user input string, one or more legacy input strings, each of the one or more legacy input strings being executable by the legacy system and comprising a syntactical arrangement of one or more of the terms; and
instructing the legacy system to execute the one or more legacy input strings.

A second method may comprise the following stages:
providing a first graphical user interface comprised of a plurality of graphical user interface elements;
receiving a selection of one of the plurality of graphical user interface elements;
providing a second graphical user interface for customizing the selected graphical user interface element, wherein the second graphical user interface element comprises:
one or more textual inputs and
one or more visual indicators, the one or more textual inputs and the one or more visual indicators representing a custom query;
receiving a textual input value and a visual indicator value within the second graphical user interface element;
modifying, in response to the textual input, the custom query associated with the selected graphical user interface element;

retrieving, periodically, the results of the custom query;

populating the selected graphical user interface element to have at least one representation of at least some of the results of the custom query; and displaying the populated graphical user interface element in the first graphical user interface.

A third method may comprise the following stages:

executing one or more input strings in one or more systems to produce results;

defining a rules engine comprising a set of rules, conditions, and events;

processing the results based on at least one of the following: the set of rules, conditions, and events; and generating a plurality of graphical user interface elements based on the application of the rules engine to the results.

A fourth method may comprise the following stages:

receiving, from a plurality of users, one or more user input strings written in a query-based database language;

generating a plurality of legacy input strings based on the one or more user input string, each legacy input string being executable within one or more of a plurality of different legacy systems;

executing the plurality of legacy input strings on the plurality of legacy systems to produce associated results for each legacy input string;

generating a plurality of graphical user interface elements displaying an arrangement of data selected from the results; and automatically making at least one recommendation to at least one user of the plurality of users.

A fifth method may comprise the following stages:

receiving a set of instructions based on a target object and one or more objectives;

automatically formulating one or more queries related to the target object and the one or more objectives; and generating one or more visual cards related to the target object and the one or more objectives, wherein the formulating one or more queries and the generating one or more visual cards is based on observed patterns and learned behaviors from one or more of a rules engine and a recommendation engine.

Although the aforementioned methods have been described to be performed by the platform 100, it should be understood that computing device 2100 may be used to perform the various stages of the method. Furthermore, in some embodiments, different operations may be performed by different networked elements in operative communication with computing device 2100. For example, a plurality of computing devices may be employed in the performance of some or all of the stages in the aforementioned method. Moreover, a plurality of computing devices may be configured much like a single computing device 2100. Similarly, an apparatus may be employed in the performance of some or all stages in the method. The apparatus may also be configured much like computing device 2100.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. By way of non-limiting example, a platform 100 (e.g., Spark™) may be hosted on, for example, a cloud computing service. In some embodiments, the platform 100 may be hosted on a computing device 2100. A user may access platform 100 through a software application and/or hardware device. The software application may be embodied as, for example, but not be limited to, a website, a web application, a desktop application, and a mobile application compatible with the computing device 2100. One possible embodiment of the software application and/or hardware device may be provided by the suite of products and services provided by Auction Edge, Inc.

Accordingly, embodiments of the present disclosure provide a software and hardware platform comprised of a distributed set of computing elements, including, but not limited to:

Still consistent with embodiments of the present disclosure, FIG. 1 illustrates a backend platform architecture of platform 100 consistent with embodiments of the present disclosure. In some embodiments, platform 100 may comprise an HTTP tunnel SSHD 105. In some embodiments, HTTP Tunnel SSHD 105 may be the starting point of data entering platform 100. In further embodiments, HTTP Tunnel SSHD 105 may connect to at least one agent container 110. In some embodiments, at least one agent container 110 may be embodied as at least one agent accessing platform 100 via interface 115. In further embodiments, at least one agent container 110 may be embodied as, for example the HVR™ suite of products. In further embodiments, HTTP Tunnel SSHD 105 may connect, via deploying system 120, to at least one AOS system 125. Deploying system 120 may be embodied as various types of hardware placing code and/or data into various modules. Deploying system 120 may be further embodied as, for example, the Octopus™ suite of products. At least one AOS system 125 may be embodied as, for example, various (legacy) types of systems that may be used in operation of platform 100. At least one AOS System 125 and/or agent container 110 may connect to processing function 135 via an operation data store ("ODS") 130 and/or at least one HTTP tunnel NLB 155. Processing function 135 may be used to process data, apply logic, transform data, and/or normalize data received from at least one AOS System 125 and/or at least one agent container 110. By way of nonlimiting example, various shades of a color such as "pearl white" and "powder white" are normalized into a single color "white." In some embodiments processing function 135 may connect to ODS 130. ODS 130 may be used to save the processed data, transformed data, and/or normalized data from processing function 135 on platform 100. In some embodiments, ODS 130 may connect to a sync function 140. Sync function 140 may be used for management of various application programming interfaces ("APIs"). Sync function 140 may further be used as a language translator to convert specific legacy commands into a universal language. In some embodiments, sync function 140 may connect to at least one end-user terminal 150 via a cloud environment 145. In some embodiments, Sync function 135 may be embodied as, for example, the Amazon App Sync™ suite of products. At least one end-user terminal 150 may be embodied as, for example, a React™ environment hosted on a personal computer and/or mobile device.

It is noted that any part and/or portion of the backend platform architecture that connects to another part and/or portion may be in bidirectional operative communication with one another.

A. Dashboard Module

FIG. 3 illustrates an example user interface, displaying a dashboard module ("dashboard") comprised of GUI elements, or cards, consistent with embodiments of the present disclosure. The GUI elements may display various data associated with the disparate computing systems, networks, and databases.

FIG. 4 illustrates an operation that enables a user to relocate a location of a GUI element. A user may be enabled to save the various layouts.

FIG. 5 illustrates an addition dashboard of GUI elements, thereby reflecting a user ability to generate a plurality of dashboard modules and share dashboard modules with other users.

B. Configure Card Module

FIG. 6 illustrates a GUI for a configure card module, configuring a GUI element within the dashboard. The GUI includes a textual input element used to receive the query-based database language. Furthermore, the GUI element may comprise various graphical elements which, when selected, enable a generation of the textual language input. In this way, as the user specifies parameters via the graphical elements, the textual input is generated, as illustrated in FIG. 7. Conversely, as the user inputs text into the query field, the parameters as represented by the graphical elements may be updated.

Further still the GUI may be designed as a structured "wizard" to enable a user to specify all the various elements of the GUI element. In turn, the GUI element may be configured to query a plurality of disparate systems which may not otherwise be inherently operable with the query-based database language, thereby creating a universal protocol. Furthermore, a user may be defined a plurality of rules and actions to be executed when the rules are met, in association with the GUI element.

C. Query Language Module

A query language module ("query language") may have a plurality of pre-defined terms easily accessible to the user, as shown in FIG. 2 and FIG. 8. Further, the query language may be formulated in accordance with a respective UI and/or GUI specification. Accordingly, the definition of the GUI element may be the ASK stage of the various methodology disclosed herein.

D. Results and Reports Module

FIG. 9 illustrates a results and reports module ("results") comprising the results of the query (e.g., a seller list, redacted for privacy, that meets the requirements of the query). A user may select a line item in the results and dive into detail with regard to that data element.

E. Seller Information Module

In this case, FIG. 10 illustrates a seller information module comprising a detailed view of a seller (redacted for privacy). The seller may be affiliated with a network that is not facilitating an auction that would not otherwise be accessible or operable to the user without the platform. The view may include yet additional GUI elements (cards) that may operate in much of the same way as the dashboard GUI elements. Similarly, the layout and view of the elements, in some embodiments, may be rearranged, shared, and saved. User Roles may be provided certain cards and views based on their role within the system. In some embodiments, machine learning may be used to identify the appropriate parameters and generate the appropriate cards, with the appropriate queries, to execute certain actions, based on, for example, the user's role and objectives. For instance, a user may be interested to obtain data on vehicles available by the seller, and configure a card to retrieve, display, alert, and act for a specific type of cars. The user may then select that GUI element to drill down and view specific cars that meet the query requirements. Again, the user may be provided with a list of results that meet the query request, as illustrated in redacted FIG. 11.

F. Vehicle Information Module

Further still, a user may drill down and see the particular item in the vehicle information module, as illustrated in redacted FIG. 12 (e.g., a vehicle). These may be the "ANSWERS" to the user's "ASK". In some embodiments, the user may be provided with a GUI element comprising list of motor vehicle dealers, retailers and/or locations, in accordance with results that meet the query request, as illustrated in FIG. 13.

G. Legacy System Communication Module

Still consistent with embodiments, a user may be enabled to add, remove, or otherwise modify data in the legacy system by way of the displayed views via a legacy system communication module. The data may then be pushed, by the universal protocol, the legacy system associated with the data. In this way, using the centralized platform, a system user may be enabled to engage in various functions and actions through legacy systems. This may be an "ACT" that a system user performs. In various embodiments, such acts may be rules based and executed with a level of pre-configured automation. It should be understood that, one technical advantage of the various embodiments disclosed herein, is the ability to employ the platform across a plurality of networks that would not otherwise work with each other electronically and/or require a physical presence.

FIG. 14 illustrates a "Pending IF" GUI element. This enables a user to set parameters for which a user may be interested in taking certain conditions "if" the conditions are met. This represented one of many possible actions that may be performed via the platform. By way of nonlimiting example, a user (buyer) may purchase a vehicle if certain conditions are met. By further way of a nonlimiting example, a user (seller) may be interested in selling a vehicle if certain conditions are met.

FIG. 15 illustrates a UI that may be designed to take actions on behalf of the user such as, for example, a bidding and/or negotiation process. Consistent with embodiments of the present disclosure, actions taken on the platform with this regard may be pushed down to the legacy system from the centralized system. In some embodiments, this process may be rules-based and, at least in part, automated. In yet further embodiments, recommendations may be provided to the user for parameters such as, for example, sale price, purchase price, and various other data points. This data may be based on data retrieved from a plurality of disparate systems that would not otherwise be relational.

III. Platform Operation

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 2100 may be employed in the performance of some or all of the stages disclosed with regard to the methods. Similarly, an apparatus may be employed in the performance of some or all of the stages of the methods. As such, the apparatus may comprise at least those architectural components as found in computing device 2100.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

A. Methods

Consistent with embodiments of the present disclosure, methods may be performed by at least one of the aforementioned modules. The methods may be embodied as, for example, but not limited to, computer instructions, which when executed, perform the methods.

FIG. 16 is a flow chart setting forth the general stages involved in a method 1600 consistent with an embodiment of the disclosure for providing the platform 100. Method 1600 may be implemented using a computing device 2100 or any other component associated with platform 100 as described in more detail below with respect to FIG. 21. For illustrative purposes alone, computing device 2100 is described as one potential actor in the follow stages.

Method 1600 may begin at starting block 1605 and proceed to stage 1610 where computing device 2100 may receive a user input string from a user. For example, the user input string may be manually typed, may be generated from a graphical user interface element having one or more textual inputs and visual indicators, or may be otherwise received by the computing device 2100.

From stage 1610, where computing device 2100 receives a user input string, method 1600 may advance to stage 1615 where computing device 2100 may parse the user input string into terms. For example, a universal protocol on the computing device 2100 may receive the user input string; parse the user input string into terms; and, for each different vehicle auction system of a plurality of different vehicle auction systems, generate one or more syntactical arrangements of the terms understandable by the vehicle auction system to form the one or more legacy input strings for the vehicle auction system. In some embodiments, the universal protocol may also apply metadata about some or all of the user, user input strings, the legacy input strings, the legacy systems, or the computing device 2100.

Once computing device 2100 parses the user input string into terms in stage 1615, method 1600 may continue to stage 1620 where computing device 2100 may, for each legacy system of a plurality of legacy systems, generate legacy input strings from the user input string for each legacy system. Each of the legacy strings is executable by a corresponding legacy system and comprises a syntactical arrangement of one or more of the terms.

For example, a user input string written in a single query-based database language may be parsed into terms which may be differently, syntactically arranged according different technical requirements for a plurality of disparate legacy systems, such as, for example, car auction systems. The legacy input strings may be executed on the legacy systems, or may cause one or more actions to take place within the legacy systems.

Further, according to some embodiments, the legacy systems may include, by way of non-limiting example, a computing system, a network, and a database. Such legacy systems may be operated, may have their use facilitated by, or may be controlled by one or more legacy input strings.

After computing device 2100 generates the legacy input strings in stage 1620, method 1600 may proceed to stage 1625 where computing device 2100 may instruct the legacy systems to execute the corresponding legacy input strings for each corresponding legacy system. For example, results or data may be obtained, or actions may be caused on a legacy system by sending a legacy input string that is executable within that system. Once computing device 2100 instructs the legacy systems to execute the legacy input strings in stage 1625, method 1600 may then end at stage 1630.

According to some embodiments, as shown in FIG. 16, once computing device 2100 instructs the legacy systems to execute the legacy input strings in stage 1625, method 1602 may proceed to stage 1635 where computing device 2100 may receive results, such as one or more data values, from the plurality of legacy systems in response to executing the one or more legacy input strings.

From stage 1635, where computing device 2100 receives data values, method 1600 may advance to stage 1640 where computing device 2100 may generate a plurality of graphical user interface elements, such as visual cards, which may represent results, data, or queries. According to some embodiments, the graphical user interface elements, including result cards, query cards, or nested or combined result or query cards, may be automatically modified based on the results of instructing each legacy system to execute the one or more legacy input strings.

Once computing device 2100 generates the plurality of graphical user interface elements in stage 1640, method 1602 may continue to stage 1645 where computing device 2100 populates the plurality of graphical user interface elements with the results, for example, by populating the plurality of graphical user interface elements with a representation of at least some of the one or more data values. Further, according to some embodiments, the universal protocol may be used to generate a normalized result set from the results or data values received from the legacy systems. The normalized data may then be treated uniformly and may be visually represented in a graphical user interface element of a graphical user interface.

After computing device 2100 populates the plurality of graphical user interface elements in stage 1645, method 1602 may proceed to stage 1650 where computing device 2100 may display the one or more populated graphical user interface elements in a graphical user interface.

Once computing device 2100 display the one or more populated graphical user interface elements in stage 1650, method 1602 may then end at stage 1655.

According to some embodiments, as shown in FIG. 16, a method 1604 may further comprise, at stage 1660, displaying a second graphical user interface having second graphical interface elements comprising one or more textual inputs and one or more visual indicators, the one or more textual inputs and the one or more visual indicators representing the user input string and being modifiable by the user. For example, a user may input text into the textual inputs and position visual indicators to provide input to a universal protocol which converts the input into legacy input strings.

In some embodiments, after the legacy input strings are generated at stage 1660, method 1604 may continue to stage 1665, where computing machine 2100 receives, periodically, results of executing the one or more legacy input strings based on the user input string for each legacy system of the plurality of legacy systems.

After periodically receiving the results of executing the legacy inputs at stage 1665, the computing device 2100 may populate one or more second graphical user interface elements to have at least one representation of at least some of the results at stage 1670 of method 1604.

One the computing device 2100 populates the one or more graphical user interface elements at stage 1670, the method 1604 advances to stage 1675 where computing device 2100 displays the second populated graphical user interface elements in a second graphical user interface.

From stage 1675 where the computing device 2100 displays the second graphical user interface elements in the second graphical user interface, method 1604 may then end at stage 1680.

FIG. 17 is a flow chart setting forth the general stages involved in a method 1700 consistent with an embodiment of the disclosure for providing the platform 100. Method 1700 may be implemented using a computing device 2100 or any other component associated with platform 100 as described in more detail below with respect to FIG. 21. For illustrative purposes alone, computing device 2100 is described as one potential actor in the follow stages.

Method 1700 may begin at starting block 1705 and proceed to stage 1710 where computing device 2100 may provide a first graphical user interface. The graphical user interface may comprise a plurality of graphical user interface elements. For example, visual cards representing custom queries (user input strings) or results (data values).

From stage 1710, where computing device 2100 provides a first graphical user interface, method 1700 may advance to stage 1715 where computing device 2100 may receive a selection of one of the plurality of graphical user interface elements. For example, a graphical user interface element that is clicked on or otherwise chosen by a user.

Once computing device 2100 receives a selection of one of the plurality of graphical user interface elements, method 1700 may continue to stage 1720 where computing device 2100 may provide a second graphical user interface for customizing the selected graphical user interface element. The second graphical user interface element may comprise one or more textual inputs or one or more visual indicators representing a custom query. In various example embodiments, values for the textual inputs and visual indicators may be used to generate the custom query, may be used as input to the universal protocol to produce the legacy queries, or may be used in a string and represented in a single query-based database language.

After computing device 2100 provides the second graphical user interface in stage 1720, method 1700 may proceed to stage 1725 where computing device 2100 may receive a textual input value and a visual indicator value within the second graphical user interface element.

From stage 1725, where computing device 2100 receives a textual input value and a visual indicator value, method 1700 may advance to stage 1730 where computing device 2100 may modify, in response to the textual input value and the visual indicator value, the custom query associated with the selected graphical user interface element.

Once computing device 2100 modifies the custom query in stage 1730, method 1700 may continue to stage 1735 where computing device 2100 may periodically retrieve the results of the custom query.

From stage 1735, where computing device 2100 periodically retrieves results, method 1700 may advance to stage 1740 where computing device 2100 may populate the selected graphical user interface element to have at least one representation of at least some of the results of the custom query.

From stage 1740, where computing device 2100 populates the selected graphical interface element, method 1700 may advance to stage 1745 where computing device 2100 may display the populated graphical user interface element in the first graphical user interface.

Once computing device 2100 displays the populated graphical user interface element in stage 1745, method 1700 may then end at stage 1750.

In some embodiments, a method 1702 of the present invention may advance from stage 1745 where the computing device 2100 displays the populated graphical user interface to stage 1750 where the computing device 2100 parses the custom query into terms.

From stage 1750 where the computing device 2100 parses the custom query, method 1702 may continue to stage 1755 where computing device 2100 generates, for each legacy system, one or more legacy queries and sends the one or more legacy queries to the legacy system to generate the results of the legacy query (which is based on the custom query). The legacy queries may comprise a syntactical arrangement of one or more of the terms parsed from the custom query. Further, the results of the custom query comprise the results of each legacy query. The custom query may be manually submitted in response to user interaction with the first or second graphical user interface or may be automatically submitted periodically or in response to a rule, condition, or event.

From stage 1755 where the computing device 2100 generates the legacy queries, method 1702 may continue to ending block 1760 where the method ends.

In some embodiments, users may preconfigure graphical user interface elements as visual cards for use or may transfer, receive, or share graphical user interface elements. For example, one user may generate a graphical user interface element that is a visual card representing a custom query related to a search for another user and may send to visual card to be used by the other user. Further, experienced, sophisticated, or "powerusers" may use an input string, which may be textually written in a single query-based database language to generate custom queries which may then be executed manually or automatically or shared with other users.

In some embodiments, one or more of the graphical user interface elements, such as those representing the results of a custom query, may be automatically updated in response to a change in the results, which change may be specified by a user, dictated by a rules engine, or generated by machine learning. In some embodiments, a user may also be notified or alerted to the change, such as by receiving a text message, audio alert, email, etc.

In some embodiments, the graphical user interface and the graphical user interface elements may be fully customizable by a user. For example, a user may alter the size, shape, position, or orientation of any of the graphical user interfaces or elements. Further, a user may combine or nest, or recursively combine or nest, graphical user interfaces and elements. For example, a graphical interface may contain a visual card representing a custom query and may also contain visual cards representing the results of that query, either in the graphical user interface or in a sub-interface. Accordingly, a user can combine any of these features to create a fully customized dashboard.

FIG. 18 is a flow chart setting forth the general stages involved in a method 1800 consistent with an embodiment of the disclosure for providing platform 100. Method 1800 may be implemented using a computing device 2100 or any other component associated with platform 100 as described in more detail below with respect to FIG. 21. For illustrative purposes alone, computing device 2100 is described as one potential actor in the follow stages.

Method 1800 may begin at starting block 1805 and proceed to stage 1810 where computing device 2100 may execute one or more input strings in one or more systems to produce results. For example, computing device 2100 may execute one or more legacy input strings in a plurality of legacy systems, such as querying a plurality of vehicle auction systems.

From stage 1810, where computing device 2100 executes the one or more input strings, method 1800 may advance to stage 1815 where computing device 2100 may define a rules engine comprising a set of rules, conditions, and events. For example, a custom query may be executed on a plurality of different legacy car auction systems to produce a list of cars and prices, and the rules engine may process the results by, for example, by selecting cars meeting a specified price range condition.

From stage 1815 where the computing device 2100 defines a rules engine, method 1800 may continue to stage 1820 where the computing device 2100 generates a plurality of graphical user interface (GUI) and/or application programming interface (API) elements based on the application of the rules engine to the results. For example, by selecting cars (or other items) from a legacy car auction system having prices meeting a specified price range condition and generating visual cards for those cars. In some embodiments, the results or data may be fully or selectively represented as GUI elements, API elements, and/or visual cards and may be fully or selectively displayed on a GUI, API, and/or dashboard as described herein.

Once computing device 2100 generates the plurality of GUIs in stage 1820, method 1800 may continue to ending block 1825 where method 1800 ends.

In some embodiments, a method 1802 may continue from stage 1820 where the computing device 2100 generates the plurality of graphical user interfaces to stage 1830 where the computing device 2100 determines, by applying the rules engine, whether to execute one or more additional input strings. These additional input strings may also be processed by the rules engine as long as the rules, conditions, and events make that determination.

In some embodiments, a method 1804 may continue from stage 1820 where the computing device 2100 generates the plurality of GUIs to stage 1835 where the computing device 2100 may make various determinations by applying the rules engine. For example, the computing device 2100 may determine whether to generate or display additional GUIs, APIs, or elements and may determine how the interfaces and elements are configured, presented, or displayed.

In some embodiments, a method 1806 further comprises receiving one or more user input strings from one or more users; and, for each legacy system of a plurality of legacy systems: automatically generating, based on the one or more user input strings, one or more legacy input strings, each of the one or more legacy input strings being executable by the legacy system and comprising a syntactical arrangement of one or more terms parsed from the one or more user input strings. These terms may be parsed from a single query-based database language and composed according to the universal protocol as described herein, and the corresponding results from the legacy systems may processed by the rules engine.

By way of nonlimiting example, an API comprising a list of vehicles purchased by a first user (buyer) may be transmitted to a second user (transportation company). The second user may then provide pricing quotes of transportation for the listed vehicles based on the API. The pricing quotes may then be transmitted to the first user. Alternatively, in accordance with at least one pre-existing rule, a quote may be chosen and transportation arranged.

A nonlimiting example of a pre-existing rule is a date requirement due to an increased demand of a particular vehicle in a designated selling area, thereby maximizing the selling price. Another nonlimiting example of a pre-existing rule is a minimization of transportation costs.

In other embodiments, the output may flow to more than a GUI. The plurality of legacy systems may comprise a GUI and/or logic unique to the respective legacy system. The GUI and/or logic may be used transmit at least one command back to platform 100. By way of nonlimiting example, platform 100 may transmit an API comprising auction inventory to a first user (buyer). The first user may connect the API to a computer system configured to filter the received inventory. In accordance with the filtered inventory, respective bids and interests may be placed by the first user.

FIG. 19 is a flow chart setting forth the general stages involved in a method 1900 consistent with an embodiment of the disclosure for providing platform 100. Method 1900 may be implemented using a computing device 2100 or any other component associated with platform 100 as described in more detail below with respect to FIG. 21. For illustrative purposes alone, computing device 2100 is described as one potential actor in the follow stages.

Method 1900 may begin at starting block 1905 and proceed to stage 1910 where computing device 2100 may receive, from a plurality of users, one or more user input strings which may be written in, for example, a query-based database language.

From stage 160, where computing device 2100 receives the one or more user input strings, method 1900 may advance to stage 1915 where computing device 2100 may generate a plurality of legacy input strings based on the one or more user input string. In some embodiments, the legacy input strings may be executable within one or more of a plurality of different legacy systems.

Once computing device 2100 generates the legacy input strings in stage 1915, method 1900 may continue to stage 1920 where computing device 2100 may instruct each legacy system of the plurality of different legacy systems to execute the one or more legacy input strings executable within the legacy system to produce associated results for each legacy input string.

From stage 1920, where computing device 2100 instructs the legacy systems, method 1900 may advance to stage 1925 where computing device 2100 may generate a plurality of graphical user interface elements displaying an arrangement of data selected from the results.

Once computing device 2100 generates the plurality of graphical user interfaces in stage 1925, method 1900 may continue to stage 1930 where computing device 2100 may automatically make at least one recommendation to at least one user of the plurality of users. For example, the computing device 2100 may display a visual card representing a recommended query or a parameter for a query or a visual card representing an item or result. In some embodiments, the recommended item may be an item that was not discovered executing a previous user input string.

From stage 1930, where computing device 2100 makes a recommendation, method 1900 may advance to ending block 1935 where the method 1900 ends.

In some embodiments, the user input strings may be parsed into terms, and the parsed terms and associated results may be compared to determine recommendations. These comparisons may be weighted, ranked, or unweighted. Further, an analysis of metadata regarding one or more of the users, the input strings, the legacy input strings, the legacy systems, and the results may also be used to determine recommendations.

Activities across a plurality of legacy systems may be monitored or otherwise observed, for example, by periodically receiving results and making comparisons, by recording, counting, and correlating one or more terms for or otherwise analyzing user input or legacy input strings, or otherwise detecting trends or patterns or making projections.

In some embodiments, the computing device 2100 may make recommendations or projections regarding various activities or parameters such as buying activity, total profit, net funds to seller, net profit to auctions, or other parameters, or optimization of these parameters or other special outcome.

In some embodiments of the present invention, the computing device 2100 may also make recommendations regarding custom queries or user input strings, including recommending a query that is visually represented in a graphical user interface element that is a visual card as described herein. Further, the recommendation engine may make recommendations regarding the configuration of graphical interfaces and graphical interface elements, for example, by providing a sample template to a user, which may be recommended based on analysis of the queries, results, or other actions of the plurality of users, such as, i.e. completion of similar transactions, execution of similar queries, or other comparison.

FIG. 20 is a flow chart setting forth the general stages involved in a method 2000 consistent with an embodiment of the disclosure for providing platform 100. Method 2000 may be implemented using a computing device 2100 or any other component associated with platform 100 as described in more detail below with respect to FIG. 21. For illustrative purposes alone, computing device 2100 is described as one potential actor in the follow stages.

Method 2000 may begin at starting block 2005 and proceed to stage 2010 where computing device 2100 may receive a set of instructions based on a target object and one or more objectives. For example, a set of instructions based on maximizing profit and minimizing sale time for an automobile listed on a car auction system.

From stage 2010, where computing device 2100 receives the instructions, method 2000 may advance to stage 2015 where computing device 2100 may automatically formulate one or more queries related to the target object and the one or more objectives. For example, computing device 2100 may formulate one or more legacy queries related to finding a car on a car auction system optimized for a lowest price and distance from a user.

Once computing device 2100 automatically formulates the one or more queries in stage 2015, method 2000 may continue to stage 2020 where computing device 2100 may generate one or more visual cards related to the target object and the one or more objectives, wherein the formulating one or more queries and the generating one or more visual cards is based on observed patterns and learned behaviors from one or more of a rules engine and a recommendation engine. For example, the computing device 2100 may automatically generate visual cards based on observed patterns and learned behaviors from rules engines and recommendation engines according to methods disclosed herein.

From stage 2020, where computing device 2100 automatically generates one or more visual cards, method 2000 may advance to ending block 2025 where the method 2000 ends.

In various embodiments, the one or more target objects may be identified by various parameters, such a sourcing, inventory, target pricing, target timing, and target radius.

Further, in various embodiments, the automatically formulated queries may be parsable into terms for generating legacy input strings for legacy systems using a universal protocol as described herein, and may be represented as graphical user interface elements, such as being represented by a visual card in a graphical user interface as described herein.

In use, a user may interact with the platform 100 using a computing device 2100 according to some embodiments as described herein. A user may provide input into the platform 100 in the form of text which may be either used directly as a user input string as described herein, may input text into one or more text fields to provide the user input string, or may toggle one or more selectors to provide user input. The user may then submit the user input string. The user input string is automatically converted to a plurality of legacy strings that are executed on corresponding legacy systems. Results of the user input string may be at least partially displayed to the user in a graphical user interface.

According to some embodiments, a user may fully customize the graphical user interface elements, as described herein.

According to some embodiments, a user may configure a rules engine by providing rules, conditions, and events as described herein. The rules engine may be applied to input queries, results, etc. to provide output such as filtered queries, results, etc. or to cause an action to take place.

According to some embodiments, a user may configure a recommendation engine by providing user input, such as a user input string. The recommendation engine may make recommendations to the user.

According to some embodiments, a user may provide a set of instructions based on a target object and one or more objectives and receive a result that is optimized for the objectives.

IV. Computing Device Architecture

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 2100. The computing device 2100 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although methods disclosed herein have been described to be performed by a computing device 2100, it should be understood that, in some embodiments, different operations may be performed by a plurality of the computing devices 2100 in operative communication at least one network.

Embodiments of the present disclosure may comprise a system having a central processing unit (CPU) 2120, a bus 2130, a memory unit 2140, a power supply unit (PSU) 2150, and one or more Input/Output (I/O) units. The CPU 2120 coupled to the memory unit 2140 and the plurality of I/O units 2160 via the bus 2130, all of which are powered by the PSU 2150. It should be understood that, in some embodiments, each disclosed unit may actually be a plurality of such units for the purposes of redundancy, high availability, and/or performance. The combination of the presently disclosed units is configured to perform the stages any method disclosed herein.

FIG. 21 is a block diagram of a system including computing device 2100. Consistent with an embodiment of the disclosure, the aforementioned CPU 2120, the bus 2130, the memory unit 2140, a PSU 2150, and the plurality of I/O units 2160 may be implemented in a computing device, such as computing device 2100 of FIG. *. Any suitable combination of hardware, software, or firmware may be used to implement the aforementioned units. For example, the CPU 2120, the bus 2130, and the memory unit 2140 may be implemented with computing device 2100 or any of other computing devices 2100, in combination with computing device 2100. The aforementioned system, device, and components are examples and other systems, devices, and components may comprise the aforementioned CPU 2120, the bus 2130, the memory unit 2140, consistent with embodiments of the disclosure.

At least one computing device 2100 may be embodied as any of the computing elements illustrated in all of the attached figures, including the content generation module, the content transmission/streaming module, the content organization module, the content display module, or in use or creation of the universal protocols, visual cards, rules engines or implemented actions, recommendation engines, and machine learning or autonomous operation. A computing device 2100 does not need to be electronic, nor even have a CPU 2120, nor bus 2130, nor memory unit 2140. The definition of the computing device 2100 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 2100, especially if the processing is purposeful.

With reference to FIG. 21, a system consistent with an embodiment of the disclosure may include a computing device, such as computing device 2100. In a basic configuration, computing device 2100 may include at least one clock module 2110, at least one CPU 2120, at least one bus 2130, and at least one memory unit 2140, at least one PSU 2150, and at least one I/O 2160 module, wherein I/O module may be comprised of, but not limited to a non-volatile storage sub-module 2161, a communication sub-module 2162, a sensors sub-module 2163, and a peripherals sub-module 2164.

A system consistent with an embodiment of the disclosure the computing device 2100 may include the clock module 2110 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 2120, the central component of modern computers, which relies on a clock. The only exceptions are asynchronous circuits such as asynchronous CPUs. The clock 2110 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 2100 use a "clock multiplier" which multiplies a lower frequency external clock to the appropriate clock rate of the CPU 2120. This allows the CPU 2120 to operate at a much higher frequency than the rest of the computer, which affords performance gains in situations where the CPU 2120 does not need to wait on an external factor (like memory 2140 or input/output 2160). Some embodiments of the clock 2110 may include dynamic frequency change, where, the time between clock edges can vary widely from one edge to the next and back again.

A system consistent with an embodiment of the disclosure the computing device 2100 may include the CPU unit 2120 comprising at least one CPU Core 2121. A plurality of CPU cores 2121 may comprise identical CPU cores 2121, such as, but not limited to, homogeneous multi-core systems. It is also possible for the plurality of CPU cores 2121 to comprise different CPU cores 2121, such as, but not limited to, heterogeneous multi-core systems, big.LITTLE systems and some AMD accelerated processing units (APU). The CPU unit 2120 reads and executes program instructions which may be used across many application domains, for example, but not limited to, general purpose computing, embedded computing, network computing, digital signal processing (DSP), and graphics processing (GPU). The CPU unit 2120 may run multiple instructions on separate CPU cores 2121 at the same time. The CPU unit 2120 may be integrated into at least one of a single integrated circuit die and multiple dies in a single chip package. The single integrated circuit die and multiple dies in a single chip package may contain a plurality of other aspects of the computing device 2100, for example, but not limited to, the clock 2110, the CPU 2120, the bus 2130, the memory 2140, and I/O 2160.

The CPU unit 2120 may contain cache 2122 such as, but not limited to, a level 1 cache, level 2 cache, level 3 cache or combination thereof. The aforementioned cache 2122 may or may not be shared amongst a plurality of CPU cores 2121. The cache 2122 sharing comprises at least one of message passing and inter-core communication methods may be used for the at least one CPU Core 2121 to communicate with the cache 2122. The inter-core communication methods may comprise, but not limited to, bus, ring, two-dimensional mesh, and crossbar. The aforementioned CPU unit 2120 may employ symmetric multiprocessing (SMP) design.

The plurality of the aforementioned CPU cores 2121 may comprise soft microprocessor cores on a single field programmable gate array (FPGA), such as semiconductor intellectual property cores (IP Core). The plurality of CPU cores 2121 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 2121, for example, but not limited to Instruction-level parallelism (ILP) such as, but not limited to, super-scalar pipelining, and Thread-level parallelism (TLP).

Consistent with the embodiments of the present disclosure, the aforementioned computing device 2100 may employ a communication system that transfers data between components inside the aforementioned computing device 2100, and/or the plurality of computing devices 2100. The aforementioned communication system will be known to a person having ordinary skill in the art as a bus 2130. The bus 2130 may embody internal and/or external plurality of hardware and software components, for example, but not limited to a wire, optical fiber, communication protocols, and any physical arrangement that provides the same logical function as a parallel electrical bus. The bus 2130 may comprise at least one of, but not limited to a parallel bus, wherein the parallel bus carry data words in parallel on multiple wires, and a serial bus, wherein the serial bus carry data in bit-serial form. The bus 2130 may embody a plurality of topologies, for example, but not limited to, a multidrop/electrical parallel topology, a daisy chain topology, and a connected by switched hubs, such as USB bus. The bus 2130 may comprise a plurality of embodiments, for example, but not limited to:

Internal data bus (data bus) 2131/Memory bus

Control bus 2132

Address bus 2133

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 2100 may employ hardware integrated circuits that store information for immediate use in the computing device 2100, know to the person having ordinary skill in the art as primary storage or memory 2140. The memory 2140 operates at high speed, distinguishing it from the non-volatile storage sub-module 2161, which may be referred to as secondary or tertiary storage, which provides slow-to-access information but offers higher capacities at lower cost. The contents contained in memory 2140, may be transferred to secondary storage via techniques such as, but not limited to, virtual memory and swap. The memory 2140 may be associated with addressable semiconductor memory, such as integrated circuits consisting of silicon-based transistors, used for example as primary storage but also other purposes in the computing device 2100. The memory 2140 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 2141, Static Random-Access Memory (SRAM) 2142, CPU Cache memory 2125, Advanced Random-Access Memory (A-RAM), and other types of primary storage such as Random-Access Memory (RAM).

Non-volatile memory which can retain stored information even after power is removed, for example, but not limited to, Read-Only Memory (ROM) 2143, Programmable ROM (PROM) 2144, Erasable PROM (EPROM) 2145, Electrically Erasable PROM (EE- PROM) 2146 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 2100 may employ the communication system between an information processing system, such as the computing device 2100, and the outside world, for example, but not limited to, human, environment, and another computing device 2100. The aforementioned communication system will be known to a person having ordinary skill in the art as I/O 2160. The I/O module 2160 regulates a plurality of inputs and outputs with regard to the computing device 2100, wherein the inputs are a plurality of signals and data received by the computing device 2100, and the outputs are the plurality of signals and data sent from the computing device 2100. The I/O module 2160 interfaces a plurality of hardware, such as, but not limited to, non-volatile storage 2161, communication devices 2162, sensors 2163, and peripherals 2164. The plurality of hardware is used by the at least one of, but not limited to, human, environment, and another computing device 2100 to communicate with the present computing device 2100. The I/O module 2160 may comprise a plurality of forms, for example, but not limited to channel I/O, port mapped I/O, asynchronous I/O, and Direct Memory Access (DMA).

Consistent with the embodiments of the present disclosure, the aforementioned computing device 2100 may employ the non-volatile storage sub-module 2161, which may be referred to by a person having ordinary skill in the art as one of secondary storage, external memory, tertiary storage, off-line storage, and auxiliary storage. The non-volatile storage sub-module 2161 may not be accessed directly by the CPU 2120 without using intermediate area in the memory 2140. The non-volatile storage sub-module 2161 does not lose data when power is removed and may be two orders of magnitude less costly than storage used in memory module, at the expense of speed and latency. The non-volatile storage sub-module 2161 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (2161) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 2100 may employ the communication sub-module 2162 as a subset of the I/O 2160, which may be referred to by a person having ordinary skill in the art as at least one of, but not limited to, computer network, data network, and network. The network allows computing devices 2100 to exchange data using connections, which may be known to a person having ordinary skill in the art as data links, between network nodes. The nodes comprise network computer devices 2100 that originate, route, and terminate data. The nodes are identified by network addresses and can include a plurality of hosts consistent with the embodiments of a computing device 2100. The aforementioned embodiments include, but not limited to personal computers, phones, servers, drones, and networking devices such as, but not limited to, hubs, switches, routers, modems, and firewalls.

Two nodes can be said are networked together, when one computing device 2100 is able to exchange information with the other computing device 2100, whether or not they have a direct connection with each other. The communication sub-module 2162 supports a plurality of applications and services, such as, but not limited to World Wide Web (WWW), digital video and audio, shared use of application and storage computing devices 2100, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 2162 may comprise a plurality of size, topology, traffic control mechanism and organizational intent. The communication sub-module 2162 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 2100 may employ the sensors sub-module 2163 as a subset of the I/O 2160. The sensors sub-module 2163 comprises at least one of the devices, modules, and subsystems whose purpose is to detect events or changes in its environment and send the information to the computing device 2100. Sensors are sensitive to the measured property, are not sensitive to any property not measured, but may be encountered in its application, and do not significantly influence the measured property. The sensors sub-module 2163 may comprise a plurality of digital devices and analog devices, wherein if an analog device is used, an Analog to Digital (A-to-D) converter must be employed to interface the said device with the computing device 2100. The sensors may be subject to a plurality of deviations that limit sensor accuracy. The sensors sub-module 2163 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 2100 may employ the peripherals sub-module 2162 as a subset of the I/O 2160. The peripheral sub-module 2164 comprises ancillary devices uses to put information into and get information out of the computing device 2100. There are 3 categories of devices comprising the peripheral sub-module 2164, which exist based on their relationship with the computing device 2100, input devices, output devices, and input/output devices. Input devices send at least one of data and instructions to the computing device 2100. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 2100. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 2164:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 2100. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 2100 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 2100. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 2162 sub-module), data storage device (non-volatile storage 2161), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present disclosure. The various Aspects are not to be construed as patent claims unless the language of the Aspect appears as a patent claim. The Aspects describe various non-limiting embodiments of the present disclosure.

Embodiments of the present disclosure may be employed on or more, or none, of the aforementioned modules, to deliver a plurality of aspects of the present disclosure. The aspects may include, but are not limited to:

Aspect 1: Universal Protocol

Embodiments of the present disclosure may provide methods and systems that connect a plurality of bidding systems, auction systems, and/or vehicle auction systems together. Each of the bidding systems may be operating based on different technical implementations and standards, and they may not otherwise be compatible for inter-operation or integration with other bidding systems.

Employing the various embodiments herein, a user may be enabled, from a centralized platform, to operate, facilitate, and control, or otherwise engage in actions related to, auctions all over the world, that run on different systems.

Embodiments of the present disclosure may provide methods and systems that provide, at least in part, a universal protocol that can function and impact changes in the various auction systems it connects to (e.g., legacy systems).

Embodiments of the present disclosure may further provide a single query-based database language configured to enable a user to operate the plurality of legacy systems (e.g., push and pull data).

Aspect 2: Operational Visual Cards

Embodiments of the present disclosure may provide methods and systems that enable a user to create a graphical user interface (GUI) element. Each GUI Element, which may be referred to as a "CARD" may be designed to display desired data from the various legacy databases/systems.

Embodiments of the present disclosure may provide methods and systems providing a GUI element that may be defined and specified by the user. In some embodiments, the GUI elements may be constructed using Query-Based Database Language and various aspects related to herein.

Consistent with embodiments of the present disclosure, the Query-Based Database Language may be used to define what data is filtered and passes through into the GUI display. In this way, the GUI element displays filtered data that matches the query.

Still consistent with embodiments of the present disclosure, alerts and various other notifications may be provided to an operator of the GUI, or other designated parties.

1. A method, comprising:

providing a first graphical user interface ("GUI") comprised of a plurality of first GUI elements;

receiving a selection of one of the plurality of first GUI elements;

providing a second GUI for customizing the selected first GUI element, the second GUI element comprising one or more textual inputs and one or more visual indicators, the one or more textual inputs and the one or more visual indicators representing a custom query associated with the selected first GUI element;

receiving a textual input value and a visual indicator value within the second GUI element;

modifying, in response to the textual input value and the visual indicator value, the custom query associated with the selected first GUI element;

retrieving, periodically, results of the custom query;

populating the selected first GUI element to have at least one representation of at least one of the results of the custom query; and displaying the populated selected first GUI element in the first GUI.

2. The method of aspect 1, further comprising:

receiving the custom query;

parsing the custom query into terms;

generating, for each of a plurality of legacy systems, one or more legacy queries, each of the one or more legacy queries being executable within each of the respective plurality of legacy system and comprising a syntactical arrangement of one or more of the terms; and transmitting the one or more legacy queries to the plurality of legacy systems to generate the results of the one or more legacy queries based on the custom query for the legacy system.

3. The method of aspect 1, further comprising writing the custom query in a single query-based database language.

4. The method of aspect 1, further comprising generating, for each of a plurality of legacy systems, one or more legacy queries from the custom query, the results of the custom query comprising the results of each of the one or more legacy queries.

5. The method of aspect 1, further comprising transmitting a legacy query to one or more of a plurality of legacy systems in response to a user interaction with the GUI.

6. The method of aspect 1, wherein the populated GUI elements comprise cards preconfigurable by a user.

7. The method of aspect 1, comprising modifying at least a part of one or more of the GUI elements in response to a specified change in the results.

8. The method of aspect 1, further comprising alerting a user in response to a specified change in the results.

Aspect 3: Rules Engine and Implemented Actions

Embodiments of the present disclosure may provide a rules engine for defining rules, conditions, events, and various other platform events that may serve as indicators or triggers for certain action.

Still consistent with embodiments of the present disclosure, a rules engine may be configured to execute a plurality of actions on the data. In some embodiments, rules may be defined for GUI elements (e.g., cards). Thus, when the GUI element displays data matching the query, a rule-based action may be executed by the platform.

Various operational aspects of the auctions may be automated and sent down the line to the legacy system. In turn, the legacy system may be operated by the universal protocol and address rules defined by all interested parties.

1. A method, comprising:

executing one or more input strings in one or more systems to produce results; defining a rules engine comprising the following:

a set of rules,
conditions, and
events;
processing the results based on at least one of the following:
the set of rules,
conditions, and
events; and
generating a plurality of graphical user interface ("GUI") elements based on the application of the rules engine to the results.

2. The method of aspect 1, further comprising determining, by applying the rules engine, whether to execute one or more additional input strings.

3. The method of aspect 1, further comprising determining, by applying the rules engine, whether to generate one or more GUI elements.

4. The method of aspect 1, further comprising determining, by applying the rules engine, whether to display one or more GUI elements.

5. The method of aspect 1, further comprising determining, by applying the rules engine, whether to generate one or more GUI.

6. The method of aspect 1, further comprising determining, by applying the rules engine, whether to display one or more GUI.

7. The method of aspect 1, further comprising determining, by applying the rules engine, a configuration for one or both of a GUI and a GUI element.

8. The method of aspect 1, further comprising:
selecting data from the results based on at least one of the set of rules, conditions, and events,
populating one or more GUI elements with a visual representation of at least some of the selected data, and
displaying the one or more GUI elements in a GUI.

9. The method of aspect 1, wherein the one or more input strings comprise one or more legacy input strings and the one or more systems comprise a plurality of different legacy systems, and wherein the method further comprises receiving a user input string and, for each legacy system of the plurality of legacy systems, generating one or more legacy input strings from the user input string using a universal protocol.

10. The method of aspect 1, wherein the one or more input strings are written in a query-based database language.

11. The method of aspect 1, wherein data matching the set of rules, conditions, and events is selectively displayed in the GUI element.

12. The method of aspect 1 wherein the one or more input strings are legacy strings generated from one or more user input strings written in a single query-based database language and the one or more systems are one or more legacy systems, the method further comprising:
receiving the one or more user input strings from one or more users; and, for each legacy system of a plurality of legacy systems:
generating, based on the one or more user input strings, one or more legacy input strings, each of the one or more legacy input strings being executable by the legacy system and comprising a syntactical arrangement of one or more terms parsed from the one or more user input strings.

Aspect 4: Recommendation Engine

Embodiments of the present disclosure may provide methods and systems to monitor activities across the plurality of legacy systems.

Embodiments of the present disclosure may provide methods and systems to analyze queries performed by a plurality of system users.

Embodiments of the present disclosure may provide methods and systems configured to detect trends and provide projections.

Embodiments of the present disclosure may provide methods and systems operative to provide user-specific recommendations of actions.

Embodiments of the present disclosure may provide methods and systems configured to optimize specific outcomes such as buying activity, total profit from buyer, net funds to sellers, net profit to auctions, etc.

In accordance with some embodiments herein, the actions may be based on the user historical data, compiled with system-wide activities, queries, and corresponding trends and projections.

Embodiments of the present disclosure may provide methods and systems configured to recommend additional GUI elements (e.g., cards) for display on the user's dashboard.

Embodiments of the present disclosure may provide methods and systems configured to recommend queries to populate visual cards.

1. A method, comprising:
receiving, from a plurality of users, one or more user input strings written in a query-based database language;
generating a plurality of legacy input strings based on the one or more user input strings, each legacy input string being executable within one or more of a plurality of different legacy systems;
instructing each of the plurality of legacy systems to execute the one or more legacy input strings executable within each of the plurality of legacy systems to produce associated results for each of the one or more legacy input strings;
generating a plurality of graphical user interface ("GUI") elements displaying an arrangement of data selected from the results; and
making at least one recommendation to at least one of the plurality of users.

2. The method of aspect 1, further comprising:
parsing the one or more user input strings into terms; and
determining the recommendations by comparing the parsed terms and associated results.

3. The method of aspect 2, wherein the comparison of parsed terms is weighted.

4. The method of aspect 1, further comprising determining the recommendations by an analysis of metadata associated with the user input strings.

5. The method of aspect 1, further comprising monitoring activities across the plurality of legacy systems.

6. The method of aspect 2, further comprising recording, counting, and correlating one or more terms of the one or more user input strings.

7. The method of aspect 1, further comprising analyzing the one or more user input strings.

8. The method of aspect 1, further comprising detecting trends in one or more of the user input strings, legacy input strings, and associated results, and providing projections to the user based on the detected trends.

9. The method of aspect 1, further comprising making recommendations specific to each user of the plurality of users.

10. The method of aspect 1, further comprising weighing recommendations according to metadata for each of the plurality of users.

11. The method of aspect 1, wherein the plurality of legacy input strings are generated based on the one or more user input strings to optimize a selected outcome.

12. The method of aspect 11, wherein the outcome optimized is selected from at least one of the following:
   a buying activity;
   a total profit from a buyer;
   net funds to sellers; and
   net profit to auctions.

13. The method of aspect 1, wherein the recommendations are based on at least one of the following:
   sets of data for each of the plurality of users;
   a set of data for the plurality of users, a set of executed strings;
   a set of detected trends; and
   a set of projections.

14. The method of aspect 1, further comprising recommending additional GUI elements for each user of the plurality of users for display on a dashboard for the user.

15. The method of aspect 1, further comprising recommending user input strings to each user of the plurality of users, the user input strings being optimized for generating, for the user, additional GUI elements relevant to that user.

Aspect 5: Machine Learning and Autonomous Operation

Embodiments of the present disclosure may employ machine learning techniques to enable autonomous operation of an online auction platform.

In some embodiments, the machine learning may be adapted into Aspect 3 and Aspect 4.

Embodiments of the present disclosure may be configured to receive a set of instructions based on a target object and objectives.

Embodiments of the present disclosure may provide methods and systems to formulate queries and generate the visual cards that are believed to be in line with the target object and objectives based on observed patterns and learned behaviors from the Rules Engine and Recommendation Engine.

Embodiments of the present disclosure may provide methods and systems may identify optimal opportunities (e.g., sourcing inventory), target pricing, target timing, and target radius (as well as other parameters).

Embodiments of the present disclosure may provide methods and systems may further allow autonomous actions and/or methods from and/or by the systems and methods of Aspects 1-4.

1. A method, comprising:
   receiving a set of instructions based on a target object and one or more objectives;
   formulating one or more queries related to the target object and the one or more objectives;
   generating one or more visual cards related to the target object and the one or more objectives, wherein the formulating one or more queries and the generating one or more visual cards is based on observed patterns and learned behaviors from at least one of the following:
   a rules engine, and
   a recommendation engine.

2. The method of aspect 1, further comprising identifying one or more target objects based on at least one of the following:
   sourcing inventory;
   target pricing; target timing; and
   target radius.

3. The method of aspect 1, further comprising;
   parsing the query string into terms; and
   for each legacy system of a plurality of legacy systems, generating one or more legacy input strings, each of the one or more legacy input strings being executable by the legacy system and comprising a syntactical arrangement of one or more of the terms, and
   executing the one or more legacy input strings within the legacy system.

4. The method of aspect 1, wherein the one or more visual cards comprise one or more visual query cards, the method further comprising:
   providing a first graphical user interface ("GUI") comprised of a plurality of GUI elements;
   displaying the one or more visual query cards in a second GUI;
   retrieving, periodically, the results of the one or more queries;
   generating one or more visual result cards representing at least some of the results; and
   populating the first GUI with the one or more visual result cards.

5. The method of aspect 1, comprising:
   executing the one or more queries in one or more systems to produce results;
   defining a rules engine comprising a set of rules, conditions, and events;
   processing the results based on at least one of the following: the set of rules, conditions, and events; and
   generating a plurality of graphical user interface elements based on the application of the rules engine to the results.

6. The method of aspect 1, comprising:
   receiving, from each user of a plurality of users, a set of instructions based on a target object and one or more objectives;
   generating a plurality of legacy input strings based on the one or more queries, each legacy input string being executable within one or more of a plurality of different legacy systems;
   executing the plurality of legacy input strings on the plurality of legacy systems to produce associated results for each legacy input string;
   generating a plurality of graphical user interface elements displaying an arrangement of data selected from the results; and
   making at least one recommendation to at least one user of the plurality of users.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claim such additional disclosures is reserved.

The invention claimed is:

1. A method for operating a plurality of legacy systems, comprising:
   for each of a plurality of first graphical user interface ("GUI") elements:

receiving a user input string associated with a first GUI element, of the plurality of first GUI elements, from a user, parsing the user input string into a plurality of terms, and generating, for each of the plurality of legacy systems, based on the user input string, one or more legacy input strings, each of the one or more legacy input strings being executable by each of the plurality of legacy systems and comprising a syntactical arrangement of one or more of the plurality of terms;

instructing the plurality of legacy systems to execute the one or more legacy input strings associated with each of the plurality of first GUI elements;

responsive to the execution of the one or more legacy input strings, receiving results from the plurality of legacy systems;

applying a user defined rules engine to the results comprising:

determining the results matching a set of rules, conditions, and events defined in the rules engine, determining whether to execute one or more additional legacy input strings, selectively displaying, in each first GUI element of the plurality of first GUI elements, results matching the set of rules, conditions, and events defined by the rules engine;

transmitting, to at least one legacy system, of the plurality of legacy systems, an instruction causing the at least one legacy system to perform one or more actions that store data to the at least one legacy system, wherein the instruction is based on the displayed results; and receiving an indication that the data was successfully stored.

2. The method of claim 1, wherein applying a user defined rules engine to the results further comprises determining a visual configuration of the matched results within each first GUI element of the plurality of first GUI elements.

3. The method of claim 1, wherein defining the set of rules, conditions, and events comprises specifying one or more of the following:
an automotive vehicle within a geolocational area,
an automotive vehicle inventory availability, and
an automotive vehicle price range condition.

4. The method of claim 3, further comprising displaying a second GUI having second GUI elements comprising one or more textual inputs and one or more visual indicators, the one or more textual inputs and the one or more visual indicators representing the user input string, the user input string being modifiable by the user.

5. The method of claim 1, further comprising:
receiving, periodically, results of executing the one or more legacy input strings based on the user input string for each of the plurality of legacy systems;
populating the plurality of first GUI elements to have at least one representation of at least one of the results; and
displaying the plurality of populated first GUI elements in a GUI.

6. The method of claim 1, further comprising executing one or more additional legacy input strings responsive to a triggering event defined by the rules engine.

7. The method of claim 6, wherein displaying, in each GUI element of the plurality of first GUI elements, the data generated based on the user input string associated with the GUI element, comprises:

receiving, from each of the plurality of legacy systems, one or more data values in response to instructing the plurality of legacy systems to execute the one or more legacy input strings;

executing a universal protocol on the one or more data values to generate a normalized result set;

populating the plurality of first GUI elements with a representation of at least some of the normalized result set; and displaying the plurality of first GUI elements in a GUI.

8. The method of claim 1, wherein the plurality of legacy systems comprises a plurality of vehicle auction systems, the method further comprising:
bi-directionally operating each of the plurality of vehicle auction systems via generating, from the user input string and using a universal protocol, the one or more legacy input strings for each of the plurality of vehicle auction systems.

9. The method of claim 8, wherein the universal protocol comprises the following:
receiving the user input string;
parsing the user input string into terms; and
generating, for each of the plurality of vehicle auction systems, one or more syntactical arrangements of the terms understandable by the plurality of vehicle auction systems to form the one or more legacy input strings for the plurality of vehicle auction systems.

10. The method of claim 9, wherein the universal protocol applies metadata to determine how the terms are syntactically arranged for each vehicle auction system to form the one or more legacy input strings for the vehicle auction system.

11. The method of claim 1, wherein defining the set of rules, conditions, and events comprises specifying one or more of the following:
a product price range,
a geolocational boundary, and
a product inventory.

12. The method of claim 1, wherein displaying, in each GUI element of the plurality of first GUI elements, the data generated based on the user input string associated with the GUI element, comprises, for each of the one or more legacy input strings:
receiving a result set for each of the one or more legacy input strings;
populating the plurality of first GUI elements with a representation of at least some of the result set; and
displaying the plurality of first GUI elements in a GUI.

13. The method of claim 1, further comprising:
operating at least one of the plurality of legacy systems with one or more legacy input strings;
facilitating use of the at least one of the plurality of legacy systems with one or more legacy input strings; and
controlling the at least one of the plurality of legacy systems with the one or more legacy input strings.

14. The method of claim 1, further comprising:
writing the user input string in a single query-based database language parsable into search terms; and
syntactically arranging the terms using a universal protocol to generate legacy input strings for the plurality of legacy systems.

15. The method of claim 1, wherein the user input string is represented as a GUI element.

16. The method of claim 15, wherein the GUI element representing the user input string is modified based on the results of instructing each of the plurality of legacy systems to execute the one or more legacy input strings.

17. A non-transitory computer readable medium configured to perform a method for operating at least one legacy system the method comprising:
    generating a plurality of graphical user interface ("GUI") elements;
    for each of the plurality of GUI elements:
        receiving an input string,
        providing a configuration interface comprising the following options for modifying the input string:
            a user selectable segment configured to modify the input string based on user selections, and
            an input portion configured to allow user syntax input to modify the input string,
        parsing the input string into at least one term, and
        generating, for each of the at least one legacy system, based on the at least one term, at least one legacy input string, the at least one legacy input string being executable by each of the at least one legacy system and comprising a syntactical arrangement of one or more of the at least one term;
    instructing the at least one legacy system to execute the one or more legacy input strings, the instructing triggering execution of a universal protocol converting input string into the at least one legacy input string;
    controlling the at least one legacy system with the at least one legacy input string;
    displaying, in each GUI element of the plurality of GUI elements, the following:
        data generated based on the input string associated with the GUI element, each GUI element being visually oriented in accordance with a specification of the user, and
        statistical information of the data generated;
    receiving a definition of a triggering event, the triggering event being based on at least one condition related to results of the instructing;
    generating an instruction based on an occurrence of the triggering event:
    transmitting, to the at least one legacy system, an instruction causing the at least one legacy system to perform one or more actions that store data to the at least one legacy system, wherein the instruction is based on the displayed generated data; and
    receiving an indication that the data was successfully stored.

18. A system for operating a plurality of legacy systems, the system comprising:
    a processing module configured to perform the following:
        receive user input strings associated with each of a plurality of graphical user interface ("GUI") elements from a user,
        provide a configuration interface comprising the following options for modifying the user input strings:
            a user selectable segment configured to modify the user input strings based on user selections, and
            an input portion configured to allow user syntax input to modify the user input strings,
        parse each of the user input strings into a plurality of terms, and
        generate, for each of the plurality of legacy systems, based on the user input strings, one or more legacy input strings, each of the one or more legacy input strings being executable by each of the plurality of legacy systems and comprising a syntactical arrangement of one or more of the plurality of terms;
    a legacy system communications module configured to perform the following:
        operate at least one of the plurality of legacy systems with one or more legacy input strings,
        facilitate use of the at least one of the plurality of legacy systems with one or more legacy input strings, and
        control the at least one of the plurality of legacy systems with the one or more legacy input strings; and
    a GUI module configured to perform the following:
        receive a result set for each of the one or more legacy input strings,
        generate one or more graphical user interface ("GUI") elements,
        populate the one or more GUI elements with the following:
            a representation of at least some of the result set, and
            a recommendation, based on a comparison of the result set and the plurality of terms, one or more of the following:
                one or more additional legacy input strings, and
                one or more additional result sets,
        display the one or more GUI elements in a GUI,
        transmit, to at least one legacy system, of the plurality of legacy systems, an instruction causing the at least one legacy system to perform one or more actions that store data to the at least one legacy system, wherein the instruction is based on the displayed generated data, and
        receive an indication that the data was successfully stored.

19. The system of claim 18, wherein the processing module is further configured to compile metadata of the user and activities on the one or more legacy systems,
    wherein the recommendation is further based on a comparison of the metadata and the activities on the one or more legacy systems.

20. The system of claim 18, wherein the comparison of the result set and the plurality of terms is weighted.

\* \* \* \* \*